US010851927B2

(12) United States Patent
Stachowiak et al.

(10) Patent No.: US 10,851,927 B2
(45) Date of Patent: Dec. 1, 2020

(54) SECURITY DEVICES INCLUDING A RETAINED LOCK, SHROUD, AND PLUG

(71) Applicant: DeWalch Technologies, Inc., Houston, TX (US)

(72) Inventors: John Edward Stachowiak, Houston, TX (US); Aditya Kumar Palthi, Houston, TX (US); Norman Binz DeWalch, Houston, TX (US); Tyler Dean Todd, II, Houston, TX (US)

(73) Assignee: DEWALCH TECHNOLOGIES, INC., Houston, TX (US)

( * ) Notice: Subject to any disclaimer, the term of this patent is extended or adjusted under 35 U.S.C. 154(b) by 195 days.

(21) Appl. No.: 16/153,347

(22) Filed: Oct. 5, 2018

(65) Prior Publication Data

US 2020/0109806 A1    Apr. 9, 2020

(51) Int. Cl.
*F16L 37/08*    (2006.01)
*F16K 35/02*    (2006.01)
*E05B 65/00*    (2006.01)

(52) U.S. Cl.
CPC .......... *F16L 37/08* (2013.01); *E05B 65/0089* (2013.01); *F16K 35/02* (2013.01)

(58) Field of Classification Search
CPC ........ F16L 37/08; F16K 35/02; F16K 35/025; F16K 35/022; F16K 35/10; E05B 65/0089; E05B 67/365; E05B 67/38; E05B 2067/386; E05B 63/121; E05B 21/06
USPC ......... 70/175, 177, 178, 180, 54–56, 32–34, 70/164, 386, 51, 52, DIG. 43, DIG. 56; 292/256.6
See application file for complete search history.

(56) References Cited

U.S. PATENT DOCUMENTS

| 3,002,368 | A | | 10/1961 | Moberg | |
|---|---|---|---|---|---|
| 3,033,016 | A | | 5/1962 | Moberg | |
| 4,193,276 | A | * | 3/1980 | Lundberg | E05B 67/365 70/34 |
| 4,252,006 | A | * | 2/1981 | Swisher | E05B 67/365 70/34 |

(Continued)

OTHER PUBLICATIONS

Inner-Tite, Cap Lock Assembly—Gas, downloaded from Internet Jan. 11, 2019, 3 pages.

(Continued)

*Primary Examiner* — Lloyd A Gall
(74) *Attorney, Agent, or Firm* — Grossman Tucker Perreault & Pfleger PLLC

(57) ABSTRACT

Security devices including a lock, shroud, and plug are described. In embodiments the security devices include a shroud that includes a shroud sidewall having an inward facing surface and an outward facing surface. The security devices further include a lock that includes a barrel, wherein the lock is integral with or coupled to the shroud to define a shroud cavity between an outward facing surface of the barrel and the inward facing surface of the shroud sidewall. The plug includes a proximal end, a distal end, and a plug sidewall receivable within the shroud cavity. The plug sidewall includes an inward facing surface defining a plug cavity configured to receive the barrel of the lock therein. Such security devices may be advanced from an assembly state to an unlocked state, and may then be reversibly moved between the unlocked state and the locked state. Security device kits are also described.

19 Claims, 34 Drawing Sheets

Assembly State

(56) References Cited

U.S. PATENT DOCUMENTS

| | | | | |
|---|---|---|---|---|
| 4,391,110 | A | * | 7/1983 | Nielsen, Jr. ............. E05B 17/16 70/34 |
| 4,492,100 | A | * | 1/1985 | Swisher ................ E05B 67/365 70/34 |
| 4,698,988 | A | * | 10/1987 | Swisher ................ E05B 67/365 70/34 |
| 4,742,703 | A | | 5/1988 | DeWalch et al. |
| 4,830,414 | A | * | 5/1989 | Davis .................... E05B 67/365 292/327 |
| 5,870,911 | A | * | 2/1999 | DeWalch ............ E05B 17/0025 70/159 |
| 6,406,074 | B1 | * | 6/2002 | Mahaney ............ E05B 65/0089 292/256.6 |
| 6,684,670 | B1 | | 2/2004 | Agbay et al. |
| 6,813,918 | B2 | * | 11/2004 | Reese ................... E05B 67/365 70/34 |
| 2006/0272369 | A1 | | 12/2006 | Stachowiak, Jr. |
| 2013/0000367 | A1 | | 1/2013 | DeWalch |
| 2014/0260456 | A1 | | 9/2014 | Dewalch et al. |
| 2015/0027176 | A1 | * | 1/2015 | Todd, II ............. E05B 65/0089 70/167 |

OTHER PUBLICATIONS

Inner-Tite, Plunger Style Barrel Locks and Keys—Electric, downloaded from Internet Jan. 11, 2019, 3 pages.

* cited by examiner

Assembly State

Unlocked State

Locked State

Top Down View

100

Exploded View

Assembly

Unlocked

Locked

Assembly State

Unlocked State

Locked State

Assembly

Unlocked

Locked

Assembly

Unlocked

Locked

Unlocked

Locked

Assembly

Unlocked

Locked

Assembly

Unlocked

Locked

Assembly State

Unlocked State

Locked State

Pre-Load

Pre-Load

SECURITY DEVICES INCLUDING A RETAINED LOCK, SHROUD, AND PLUG

TECHNICAL FIELD

The present disclosure generally relates to security devices that include a retained lock, shroud, and plug. In particular, the present disclosure relates to security devices that including a retained barrel lock, shroud, and plug.

BACKGROUND

Utility and other companies often utilize security devices such as locks to secure utility meters or other company property. For example, electric service providers often secure electric meter boxes with one or more locks, e.g., to prevent customers from tampering with the meter. Using the meter, the electric service provider can determine the amount of electricity consumed by a customer and issue bills to the customer based on their proportionate usage. If the customer fails to pay their bill (or for another reason), the electric service provider may discontinue providing electric service to the customer, e.g., by shutting off service to the customer at a transformer close to the user's home and/or by disconnecting service using an electronic control system. Such methods of disconnecting service are advantageous in that they may not require a technician to visit the user's home to effect the disconnection (resulting in improved employee safety), and because it is generally difficult for a customer to circumvent the disconnection and reinstate their service without permission of the electric service provider.

Liquid and gas utilities are often supplied to customers via a pipe or other conduit that extends from a source (e.g., a tank or gas/water main distribution line) to within the customer's home or business. Like electric service providers, suppliers of gas and liquid utilities often use a meter that is installed proximate the customer's location to determine the amount of product that is consumed by the customer over a given time period, enabling the supplier to bill the customer for their proportionate usage. And like an electric service provider, suppliers of gas and liquid utilities may wish to disconnect service to a customer and/or cap an open line on an as needed basis.

Because gaseous and liquid products are generally supplied under pressure to a customer's location, however, disconnecting such a service may require physically blocking the flow of gaseous of liquid product to the customer's location. Many known devices (e.g., shutoff valves, plugs, etc.) can physically block the flow of gas or liquid through a pipe. Although such devices can be used by a utility company to shut off the supply of liquid or gaseous product to a customer (e.g., by blocking flow through the pipe/conduit leading to the customer's point of service), it may be relatively easy for the customer to reinstate that supply by reversing operation of the device. Thus, a customer may circumvent disconnection of their service simply by opening a shut off valve and/or removing a shut off plug, thereby reinstating the flow of gas or liquid to their location circumventing the disconnection of their service. Consequently, utility companies often secure shutoff devices such as plugs and valves with one or more security devices (e.g., locks, cases, etc.), to prevent tampering. While such security devices can be effective, their use can increase cost, complicate the installation of a shutoff device, and/or present other issues.

A need remains, therefore, for security devices that are relatively simple to manufacture, use, and install, yet which prevent or adequately resist tampering.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1A:
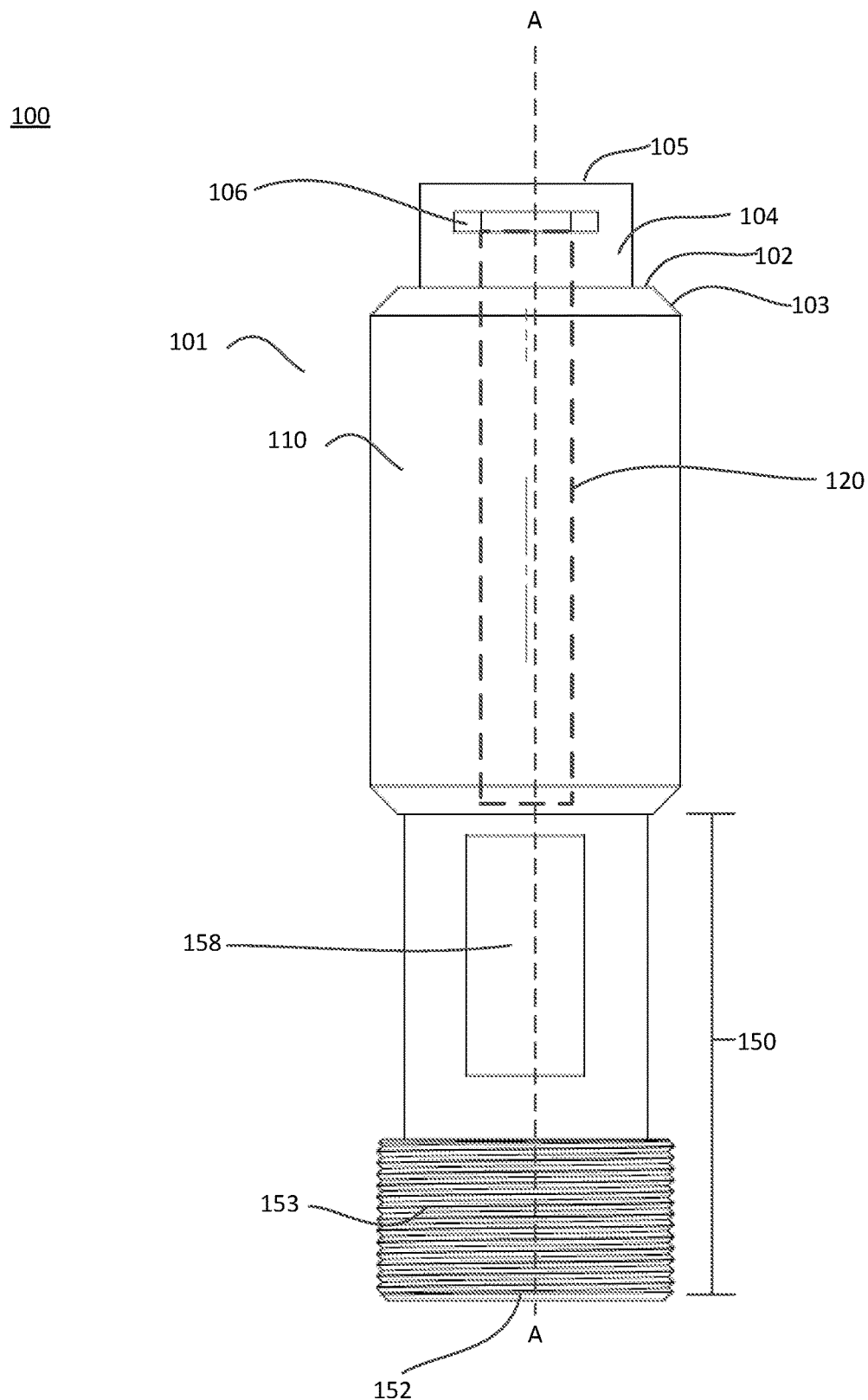
FIG. 1A is a side view block diagram of one example of a security device in an assembly state, consistent with the present disclosure.

As noted in the background utilities and other companies often utilize one or more shutoff devices to control the provision of services (e.g., utilities such as gas, liquid (water), etc.) to customers. Relatively simply shutoff devices such as valves and plugs can effectively stop the supply of gas and/or liquid through a pipe or conduit, but may be susceptible to tampering that reinstates supply of gas and/or liquid without the supplier's permission. In instances where a simple shutoff device is used to terminate gas or liquid service to a customer, for example, the customer may circumvent disconnection of the service by removing the shutoff device (in the case of a plug) or reversing its operation (in the case of a valve). Consequently, utilities and other companies often protect shutoff devices with one or more security devices such as a lock, a case, or a combination thereof. While conventional locks and cases can effectively protect shutoff devices, they too are subject to tampering. For example, a lock or case may be subject to physical attack by a customer (e.g., with a pry bar, bolt cutter, or the like). While the lock or case may foil such attacks, they may be damaged to the point of requiring replacement. Conventional locks and cases may also increase company cost, increase the time needed to access shutoff devices, etc.

To address the above issues research has led to the development of shutoff assemblies that include integral security features. Such devices can offer improved security over conventional valves and plugs, as well as relatively simple operation. One example of such a device is a high security plug lock assembly. Such an assembly may include a threaded plug that is configured to threadably engage with corresponding threads in a pipe (e.g., female threads within an open end of a pipe), thereby blocking flow of gas or liquid through the pipe. The plug also includes one or more gripping surfaces that facilitate installation and removal of the plug with a tool such as a wrench. Following installation of the threaded plug, a cover may be installed over the gripping surfaces of the plug and secured with a lock, such as a barrel lock. The cover is freely rotatable about the plug (and the gripping surface thereof), making it substantially more difficult to remove the plug without first unlocking the lock and removing the cover to expose the gripping surfaces.

While high security plug assemblies can be useful, they are not without drawbacks. For example, high security plug assemblies are generally supplied as separate components that must be assembled on site. That complicates their installation and can lead to portions of the device being lost. A key may also be needed to assemble the components of the plug assembly prior to installation, and to remove the plug assembly when it is no longer needed. Thus, widespread distribution of keys to installation personnel may be needed; raising the risk of key loss. Installation of high security plug assemblies may also be time consuming, leading to increase risk to installation personnel—who may need to install the plug in the presence of a dangerous or upset customer.

Thus, a need remains in the art for security devices that are relatively simple to manufacture, use, and install, yet which prevent or adequately resist tampering. The present disclosure addresses that need by providing security devices that include a retained lock, shroud, and plug. In embodiments, the security devices described herein include a shroud that includes at least one shroud sidewall having an inward facing surface and an outward facing surface. The security devices further include a lock that includes a barrel, wherein the lock is integral with or coupled to the shroud, such that a shroud cavity is defined between an outward facing surface of the barrel and the inward facing surface of the at least one shroud sidewall. The plug includes a proximal end a distal end, and at least one plug sidewall receivable within the shroud cavity. The at least one plug sidewall includes at least one inward facing surface that defines a plug cavity that is configured to receive the barrel of the lock therein. Such security devices may be advanced (e.g., by a manufacturer) from an assembly state to an unlocked state. Once in the unlocked state, the security device may be reversibly moved between the unlocked state and the locked state.

The security devices further include at least one retention element that is configured to retain at least a portion of the plug within the shroud cavity when the security device is in the unlocked state. Put differently, when the security device is in the assembly state the plug may be completely removed from the shroud cavity. In contrast, once the security device is in the unlocked state the retention element may hinder or prevent complete removal of the plug from the shroud cavity. In embodiments, the security devices can be returned to the assembly state from the unlocked state via the use of a service key. In other embodiments the security devices may not be returned to the assembly state without damage.

Any suitable type of retention element may be used in the security device described herein. In some embodiments the at least one retention element is in the form of one or more retention balls, one or more retention pins, one or more retention surfaces, or a combination thereof. In some instances the at least one retention element is in the form of a retention ball or retention pin, which may be disposed within a retention housing formed in an outward facing surface of the plug sidewall. In such instances the security device may further include a retention bias mechanism that is configured to bias the retention element against the inward facing surface of the at least one shroud sidewall. The shroud sidewall may further include proximal and distal retention surfaces that each extend inwardly towards the barrel of the lock. When the security device is in the unlocked state, the at least one retention element abuts the distal retention surface, preventing removal of the proximal end of the plug from the shroud cavity. When the security device is in the locked state, the at least one retention element is disposed proximate to the proximal retention surface.

Alternatively or additionally, in some embodiments the at least one retention element is in the form of one or more plug retention surfaces within the plug cavity. In such instances the lock of the security device may further include a lock shaft including a locking element receiver within the barrel, a locking element actuator within the lock shaft, and at least one locking element that is movable between a locked and unlocked state via the locking actuator. When the security device is in the unlocked state, the plug retention surface interferes with (i.e., captivates) the at least one locking element, inhibiting removal of the proximal end of the plug from the shroud cavity.

In some embodiments, the locking element actuator may include a distal portion having a diameter D1, a proximal portion having a diameter D2, a first medial portion having a diameter D3 between the proximal and distal portions, and a second medial portion having a diameter D4 between the first medial portion and the proximal portion, wherein D4>D3>D2>D1. In such embodiments when the security device is in the unlocked state, the locking element actuator is positioned such that the at least one locking element abuts the first medial portion of the locking element actuator. In that position the at least one locking element is disengaged from the locking element receiver, enabling movement of the barrel within the plug cavity and away from the distal end of the plug. However, part of the at least one locking element inhibits or prevents removal of the proximal end of the plug from the cavity by extending through the at least one opening to interfere with said plug retention surface. When the security device is in the locked state, the locking element actuator is positioned such that the at least one locking element abuts the second medial portion of the locking element actuator. In that position the at least one locking element is received within the locking element receiver. To transition the lock from the unlocked state to an assembly state, the locking element actuator is retracted such that the at least one locking element abuts the distal portion of the locking element actuator. In that position the at least one locking element may be moved past the at least one plug retention surface, allowing the security device to be moved to an assembly state and/or allowing the plug to be completely removed from the shroud cavity.

Figure 1B:
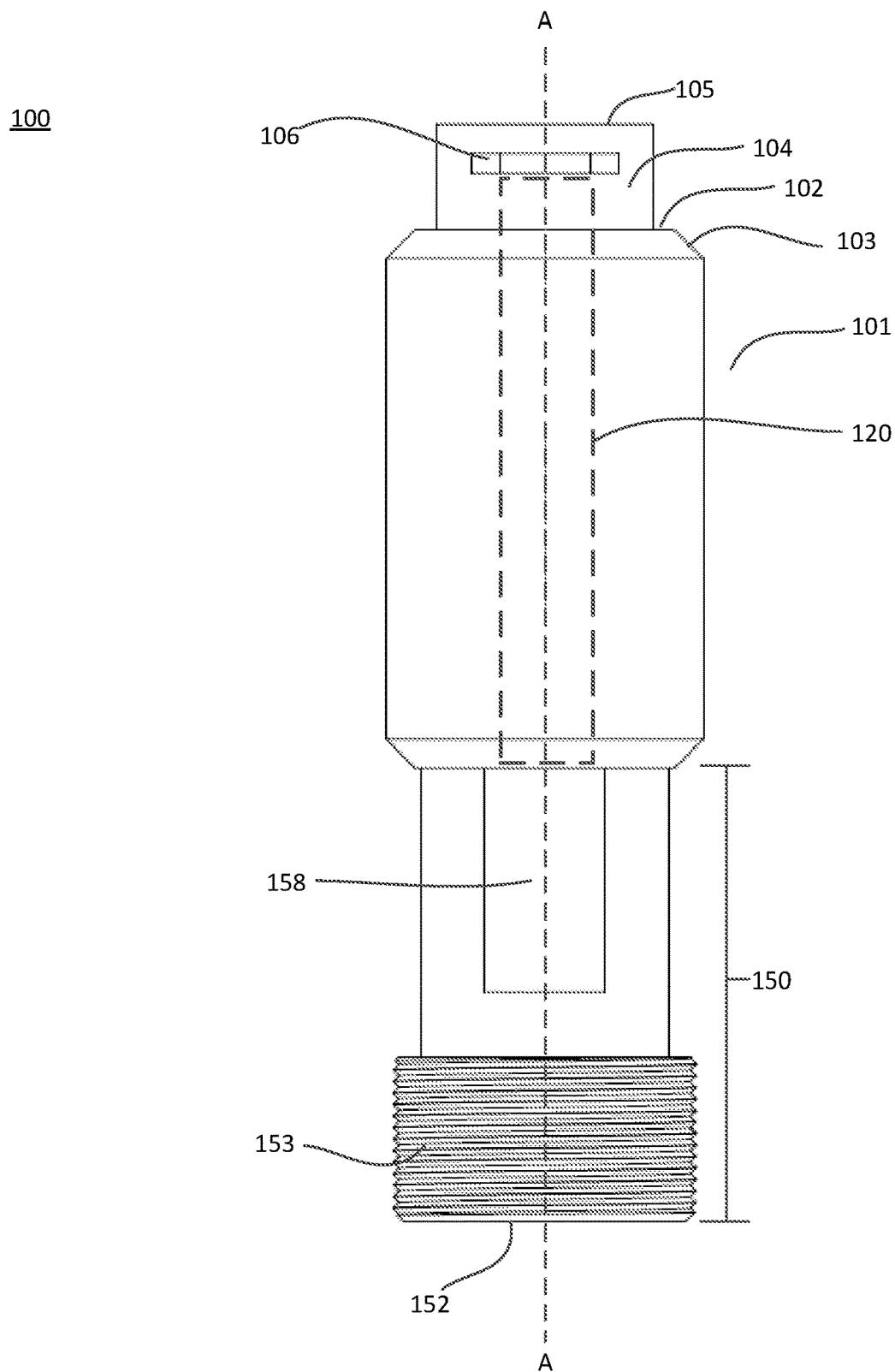
FIG. 1B is a side view block diagram of the security device of FIG. 1A, in an unlocked state.
Figure 1C:
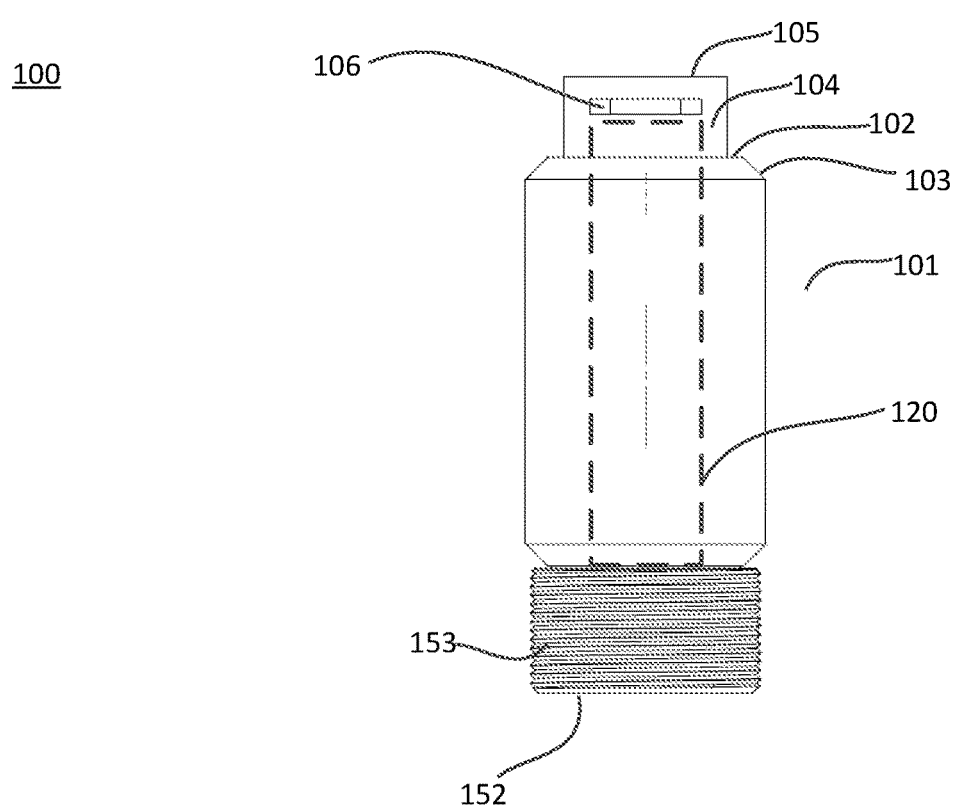
FIG. 1C is a side view block diagram of the security device of FIGS. 1A and 1B, in a locked state.
Figure 1D:
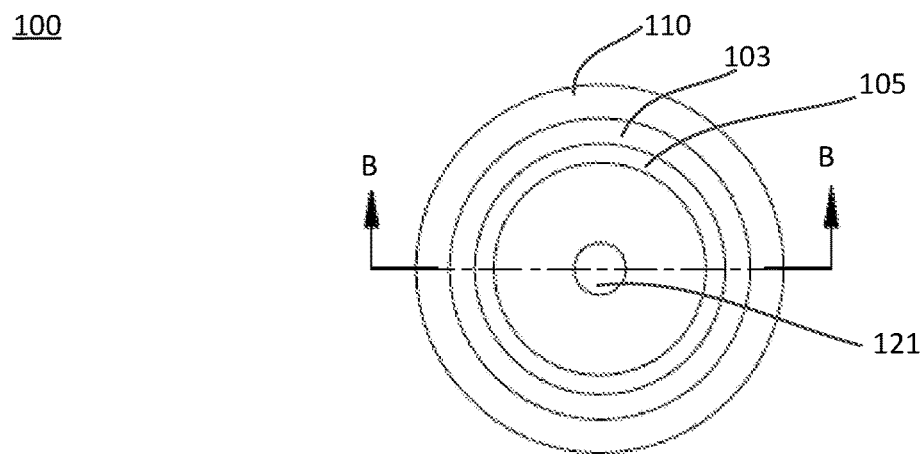
FIG. 1D is a top down view of the security device of FIGS. 1A-1C.

FIGS. 1A-1L depict various views of a generic example of a security device consistent with the present disclosure. As best shown in FIGS. 1A-1C, security device 100 includes a shroud 101, a lock 120, and a plug 150, which are movable between an assembly state (FIG. 1A), an unlocked state (FIG. 1B), and a locked state (1C). In general, when the security device 100 is in the assembly state the plug 150 may be separated from the shroud 101. Once the security device is advanced to the unlocked state, however, separation of the plug 150 from the shroud 101 may be inhibited, e.g., by one or more retention elements (not shown in FIGS. 1A-1L). The security device 100 may be advanced from the unlocked state shown in FIG. 1B to the locked state shown in FIG. 1C by the application of a force along an axis A extending through a length of the lock 120, as shown in FIG. 1B. In the locked state, at least one locking element within the lock prevents security device 100 from returning to the unlocked state without the use of an appropriate key.

As further shown in FIGS. 1A-1C and 1G, shroud 101 has a proximal end and a distal end. In embodiments the proximal end terminates in a head 104 and the distal end terminates with a distal shroud abutment surface 114, as shown for example in FIG. 1G. In various embodiments, shroud 101 is depicted as including a shoulder 102 and a bevel 103 provide a transition between the head 104 and sidewall 110 (also referred to herein as a shroud sidewall). Such features are not required, however, and shroud 101 may have any suitable shape. For example, shoulder 102 may be omitted and bevel 103 may span from shroud sidewall 110 to rim 105 of head 104. Alternatively shoulder 102 may be omitted and a taper may extend between shroud sidewall 110 and rim 105 of head 104. In still other embodiments, shoulder 102 and bevel 103 may be omitted, and shroud sidewall 110 may extend such that it is substantially coplanar with the rim 105 of head 104. In such embodiments, shroud sidewall 110 may be configured to form the rim 105.

As shown in various FIGS., head 104 may also include an optional slot 106. When used, slot 106 may be configured to facilitate tamper detection. For example, slot 106 may be configured to receive and retain a tamper detection ring or other component therein, the condition (or absence) of which may indicate or otherwise suggest tampering with security device 100. Of course, slot 106 is not necessary, and the configuration of slot 106 is not limited to the configuration shown in the FIGS.

Figure 1E:
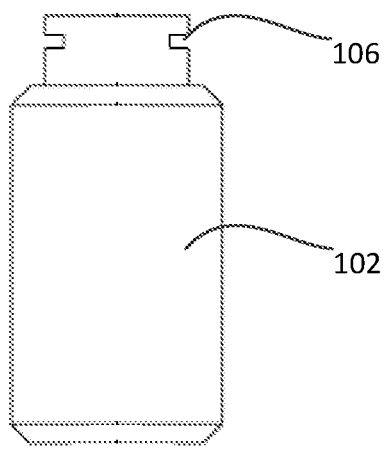
FIG. 1E is an exploded view of the security device of FIGS. 1A-1C.
Figure 1E:
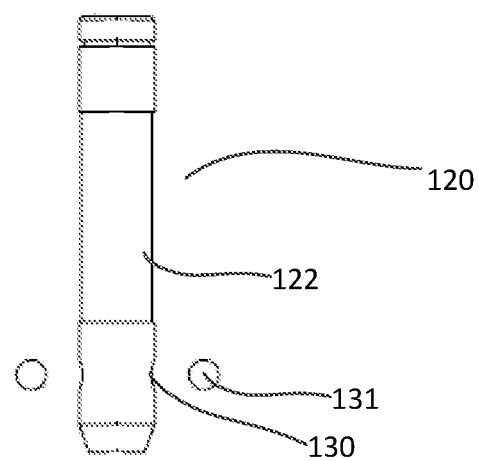
Figure 1E:
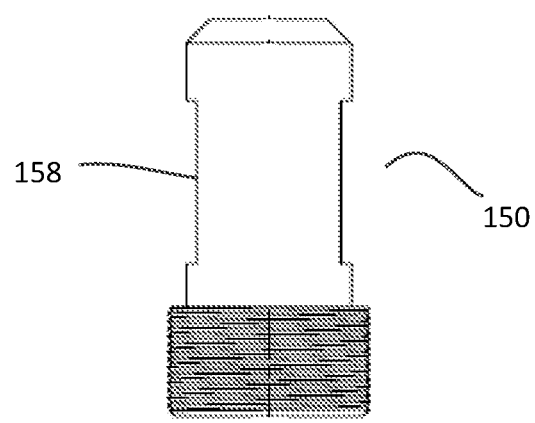
Figure 1F:
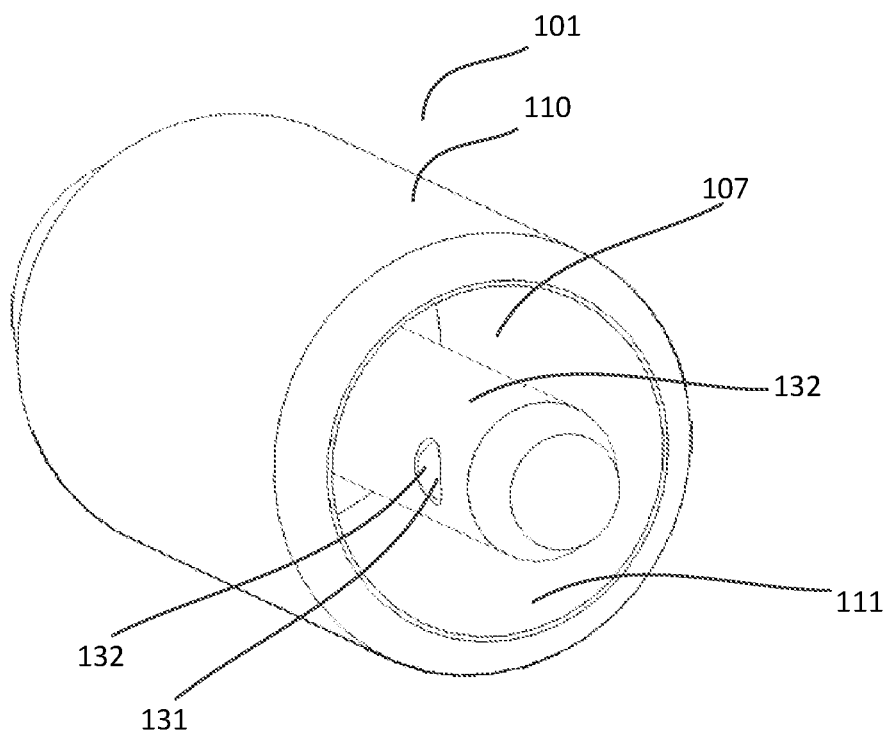
FIG. 1F is a perspective view of an example shroud and lock utilized in the security device of FIGS. 1A-1C.
Figure 1G:
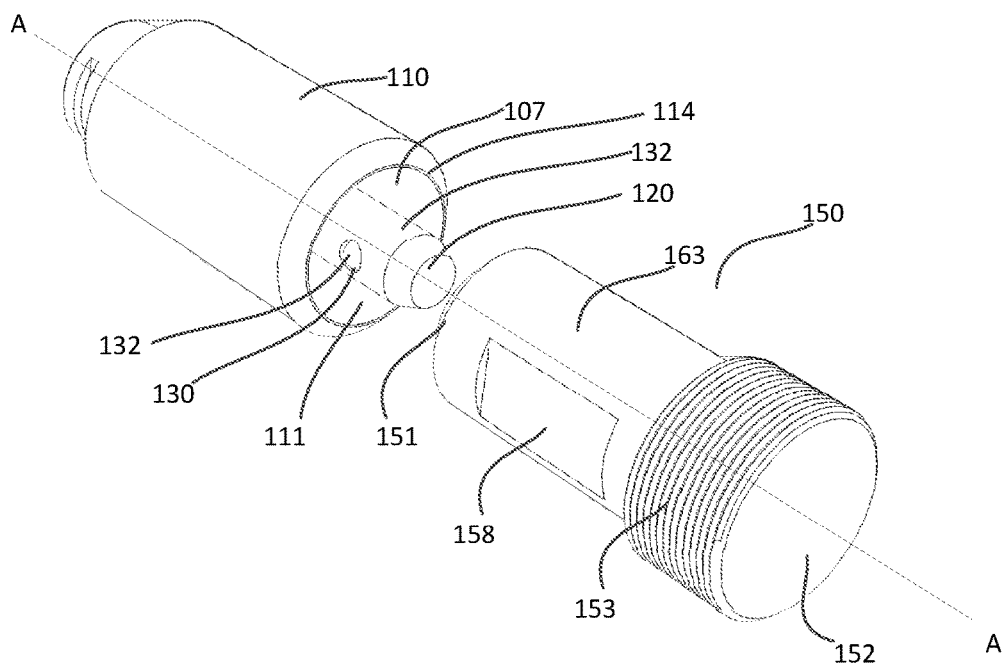
FIG. 1G is perspective partially exploded view of a shroud, lock, and plug utilized in the security device of FIGS. 1A-1C.

As best shown in FIGS. 1F and 1G, the shroud sidewall 110 includes at least one inward facing surface 111. For the sake of example, the illustrated embodiments depict shroud 101 depicted as including a single circular or cylindrically shaped shroud sidewall 110 that includes an outward facing surface (not labeled) that opposes inward facing surface 111. Such a configuration is not required, however, and shroud 101 may include any suitable number of shroud sidewalls with any suitable number of corresponding inward facing surfaces, provided that shroud 101 is freely rotatable about plug 150.

As generally shown in FIGS. 1A-1C and as best shown in FIGS. 1F-1G, lock 120 is disposed within shroud 101. More specifically, the barrel 122 of lock 120 is integral with or coupled to shroud 101, such that it extends along axis A shown in FIGS. 1B, 1F, and 1G. In this context the term "integral" means that the barrel 122 and shroud 101 are formed as a single unitary (monolithic) piece. In contrast the term "coupled" means that the barrel 122 and shroud 101 are separate pieces that are mechanically joined to one another in some manner, e.g., via a fastener, interference between elements/surfaces (hereinafter referred to as "captivation"), a joint, or the like. Various embodiments in which barrel 122 is integral with or coupled to shroud 101 will be described later regarding other embodiments. In any case, barrel 122 is positioned within shroud 101 such that a shroud cavity 107 is defined between an outward facing surface 132 of barrel 122 and the inward facing surface 111 of shroud 101, as best shown in FIG. 1F.

Figure 1H:
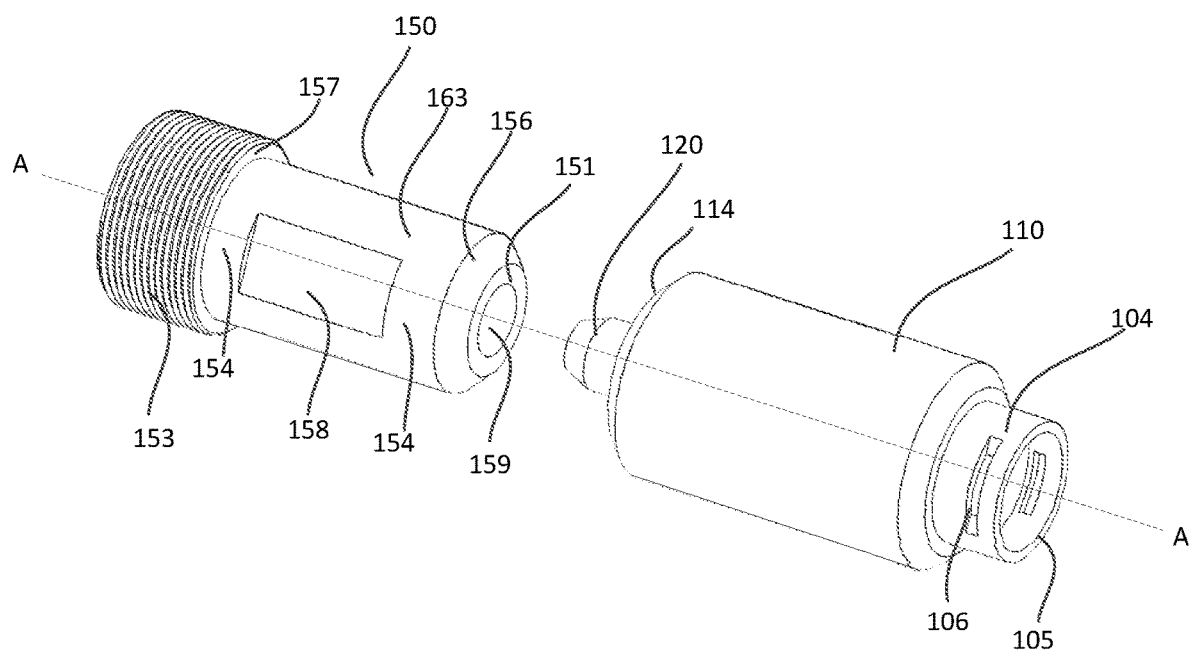
FIG. 1H is another perspective partially exploded view of a shroud, lock, and plug utilized in the security device of FIGS. 1A-1C.
Figure 1I:
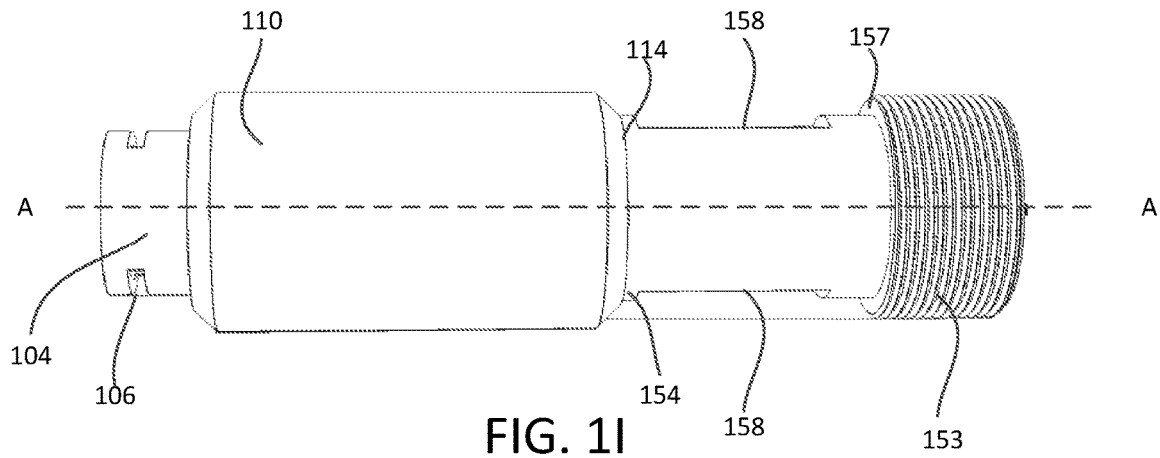
FIG. 1I is another side view of the security device of FIGS. 1A-1C, in an assembly state.
Figure 1J:
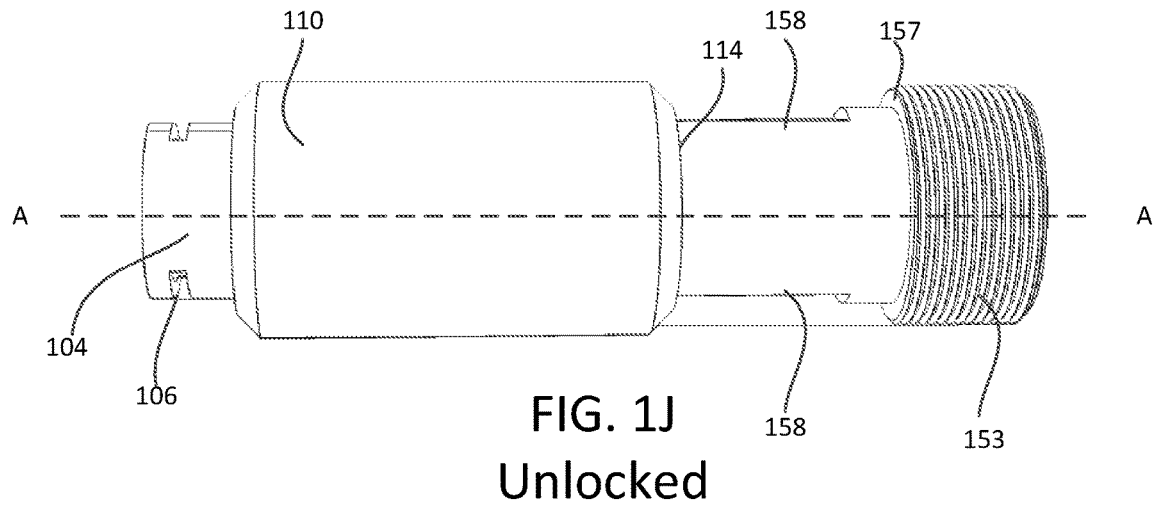
FIG. 1J is another side view of the security device of FIGS. 1A-1C, in an unlocked state.
Figure 1K:
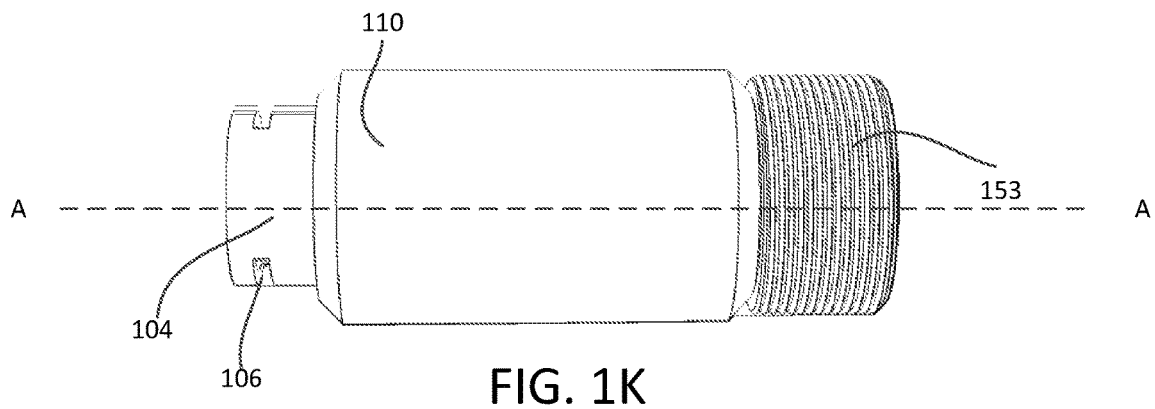
FIG. 1K is another side view of the security device of FIGS. 1A-1C, in a locked state.

As best shown in FIGS. 1G-1H, plug 150 includes a plug proximal end 151, a plug distal end 152, and a plug sidewall 163. The plug sidewall 163 includes at least one outward facing surface and at least one inward facing surface (not labeled), wherein the at least one inward facing surface defines a plug cavity 159 that is configured to receive the barrel 122 of lock 120 therein. In embodiments and as shown in various FIGS., plug sidewall 163 may have substantially circular or cylindrical profile, though other configurations may also be used. As will become clear later, plug cavity 159, plug sidewall 163, lock 120, and shroud cavity 107 are configured such that barrel 122 may be inserted and slid within the plug cavity 159 along axis A, while plug sidewall 163 is inserted and slid within shroud cavity 107 along axis A. Thus, in some embodiments the barrel 122 may have an external diameter than is sized to fit within an internal diameter of plug cavity 159, allowing barrel 122 to be slid within the plug cavity 159. Similarly, plug sidewall 163 may have dimensions that are complementary to the dimensions of shroud cavity 107, such that plug sidewall 163 can be received and slid within shroud cavity 107.

As best shown in FIGS. 1E and 1F, lock 120 includes a barrel 122, a locking element carrier 130, and one or more locking elements 131. In embodiments the locking element carrier 130 is in the form of a slot or opening within barrel 122, through which locking elements 131 may be disposed. For example, in an unlocked state locking elements 131 may move radially inward through locking element carrier 130 and towards a shaft (not shown) within barrel 122, so as to disengage from a locking element receiver (not shown in FIGS. 1A-1L) within plug 150. In the locked state, the locking elements 131 may move radially outward through locking element carrier 130 to engage with the locking element receiver. In that position, the locking elements 131 may interfere with the movement of the plug 150 relative to the barrel 122, maintaining security device 100 in the locked state as will be described later. In other embodiments, the locking element carrier is in the form of a shuttle or other device that is configured to reposition the locking elements 131. In any case, once security device 100 is in the locked state, a key (e.g., a plunger key) may be inserted into a keyway (not shown in FIGS. 1A-1L) and used to cause the locking element actuator to retract or otherwise move, allowing the locking elements 131 to disengage from a locking element receiver and permitting the security device 100 to return to an unlocked state.

Figure 1L:
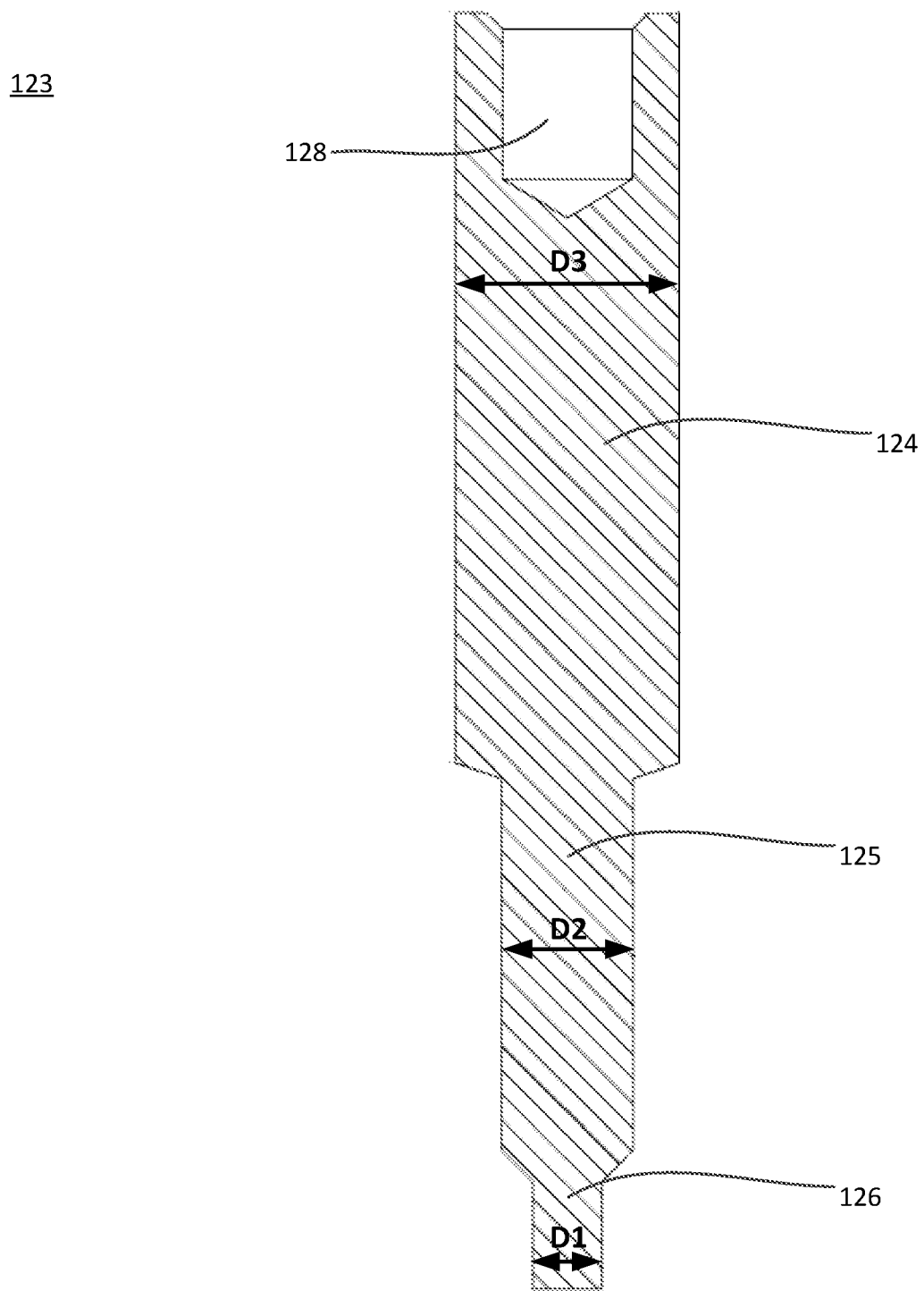
FIG. 1L depicts a locking element actuator used in a lock of the security device of FIGS. 1A-1C.

For the sake of illustration the locking elements 131 are depicted in various FIGS. as being in the form of locking balls. This concept is best shown in FIG. 1E, which illustrates lock 120 as including locking elements 131 in the form of two locking balls. In such instances locking element carrier 130 may be in the form of through holes that extend from a lock shaft (not shown in FIGS. 1A-1L) through barrel 122. When used, the through holes may be sized to permit radial inward and outward movement of locking elements 131, e.g., in response to a locking element actuator. For example lock 120 may be in the form of a barrel lock that includes a locking element actuator 123 in the form of a plunger, as shown in FIG. 1L. In such instances the plunger may be a generally cylindrical structure having multiple different diameters. For example the plunger may include a proximal portion 124, a distal portion 126, and a medial portion 125 between the proximal portion 124 and distal portion 126.

The distal portion 126 may have a diameter D1, the medial portion 125 may have a diameter D2, and the proximal portion 124 may have a diameter D3, wherein D3>D2>D1. As will be described later in connection with other embodiments, the plunger may be configured such that when security device 100 is in a locked state, locking elements 131 are displaced radially outward through the locking element carrier 130 by the medial portion 125 of locking element actuator 123, such that locking elements 131 engage a locking element receiver (not shown). To move the security device 100 to the unlocked state from the locked state, a key may be used to cause locking element actuator 123 to retract toward head 104. Retraction of the locking element actuator 123 allows the locking elements 131 to move radially inward through locking element carrier 130 to abut distal portion 126. In such a state, the locking elements 131 are disengaged from medial portion 125 and the locking element receiver, and are located within the extent of the plug cavity 159 of plug 150, allowing the security device 100 to be moved to the unlocked state.

All or a portion of plug 150 may be configured to couple with an external device, such as a pipe or other conduit. For example and as shown in various FIGS., a distal portion of plug 150 may include external threads 153 that are configured to mate with corresponding internal threads, e.g., located within a pipe or conduit. Of course threads 153 are illustrated for the sake of example only, and plug 150 may be configured to couple with an external device in any suitable manner. In embodiments where plug 150 includes threads 153, such threads may begin proximate a plug distal abutment surface 157 and extend towards distal end 152. In such instances the plug distal abutment surface 157 may be positioned such that it abuts with a distal shroud abutment surface 114 of shroud 101 when security device is in a locked state. Plug 150 may further include a proximal abutment surface 156, that is configured to abut with abutment surfaces of shroud 101 (e.g., within shroud cavity 107) when the security device is in a locked state, as shown and described later regarding other embodiments. Of course, plug 150 need not include threads 153, and other features that enable plug 150 to couple with an external device may be used.

Plug 150 may also include at least one gripping surface 158. In embodiments the at least one gripping surface is formed within a plug sidewall 163, as shown in various FIGS. and best shown in FIGS. 1G-1J. In general, the at least one gripping surface 158 is configured to provide a surface that facilitates the installation of security device with a tool, such as a wrench. For the sake of example, various FIGS. depict plug 150 as including a cylindrical plug sidewall 163 that includes two flat gripping surfaces 158. It should be understood that such configuration is not required, and that any suitable number of gripping surfaces 158 may be used. As best shown in FIGS. 1A-1C and 1I-1L, the at least one gripping surface 158 may be fully or substantially exposed when security device 100 is in an assembly state or an unlocked state. When the security device 100 is in a locked state, however, the shroud 101 may fully or substantially cover the at least one gripping surface 158. Consequently, shroud 101 may hinder or prevent engagement of the at least one gripping surface 158 with a tool (e.g., a wrench) while the security device 100 is in the locked state. Because the shroud 101 is freely rotatable about the plug 150 while security device 100 is in the locked state, rotation of the shroud 101 will not turn plug 150 and, thus, prevents or hinders the backing out of threads 153 from corresponding threads of another device.

As noted above and as shown in FIGS. 1A-1C and FIGS. 1I-1K, the security device 100 may be advanced from an assembly state (FIGS. 1A, 1I) to an unlocked state (FIGS. 1B, 1J) by the application of a force along axis A. Although not shown in such FIGS. security device 100 further includes at least one retention element. As will be described later in connection with other embodiments, the at least one element may function to retain at least a portion of plug 150 within the shroud cavity 107 while the security device is in the unlocked state. Put differently, the at least one retention element may retain the plug, lock, and shroud in an assembled but unlocked state, even when the locking elements 131 of lock 120 are disengaged from a locking receiver within plug cavity 159.

With the foregoing in mind, various security devices consistent with the present disclosure will now be described in reference to the other figures. Unless otherwise expressly indicated the above general description should be considered to apply to all of the following embodiments.

Figure 2A:
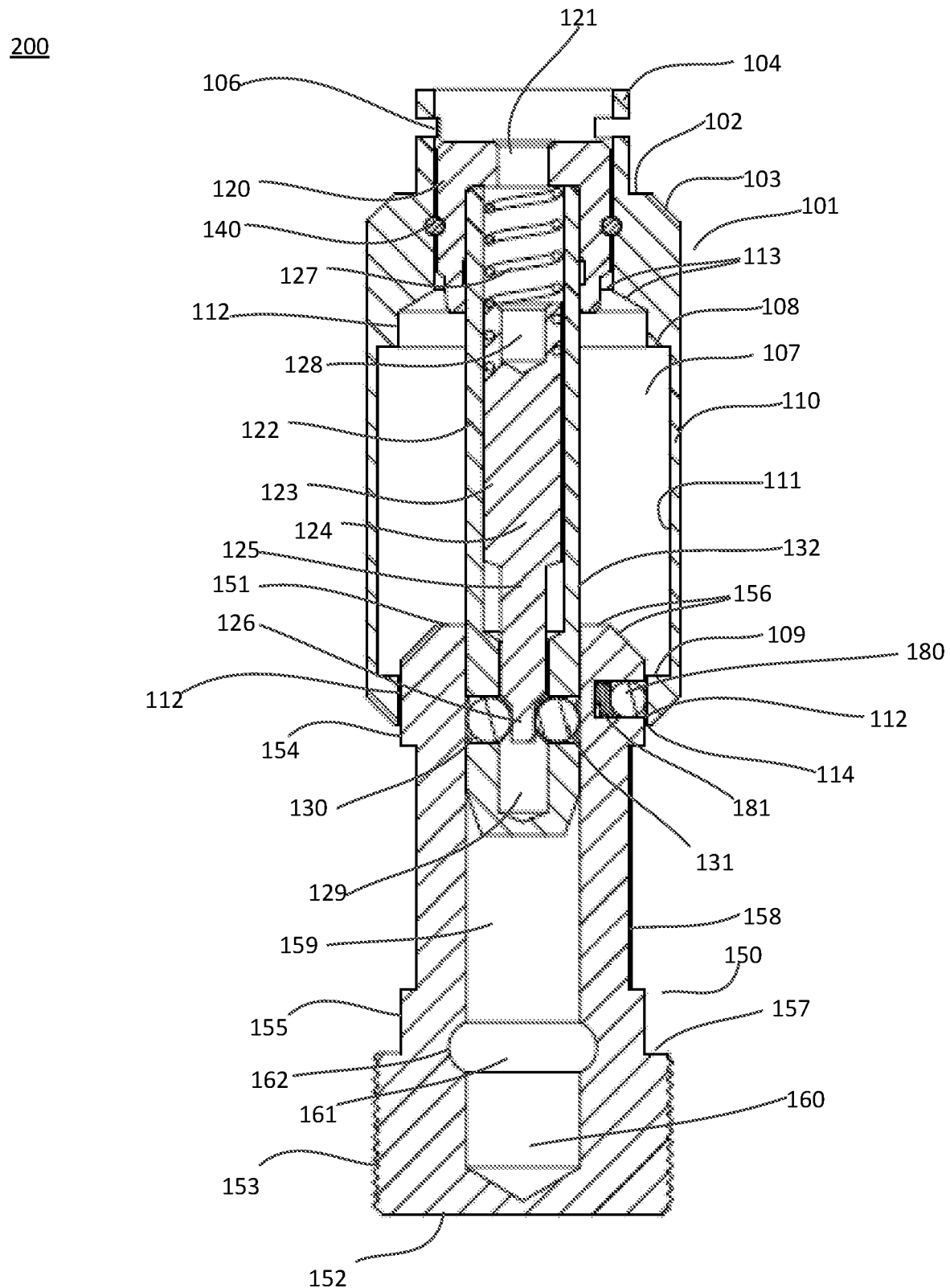
FIG. 2A is a cross sectional view of another example of a security device including a retained shroud, lock, and plug in an assembly state, consistent with the present disclosure.
Figure 2B:
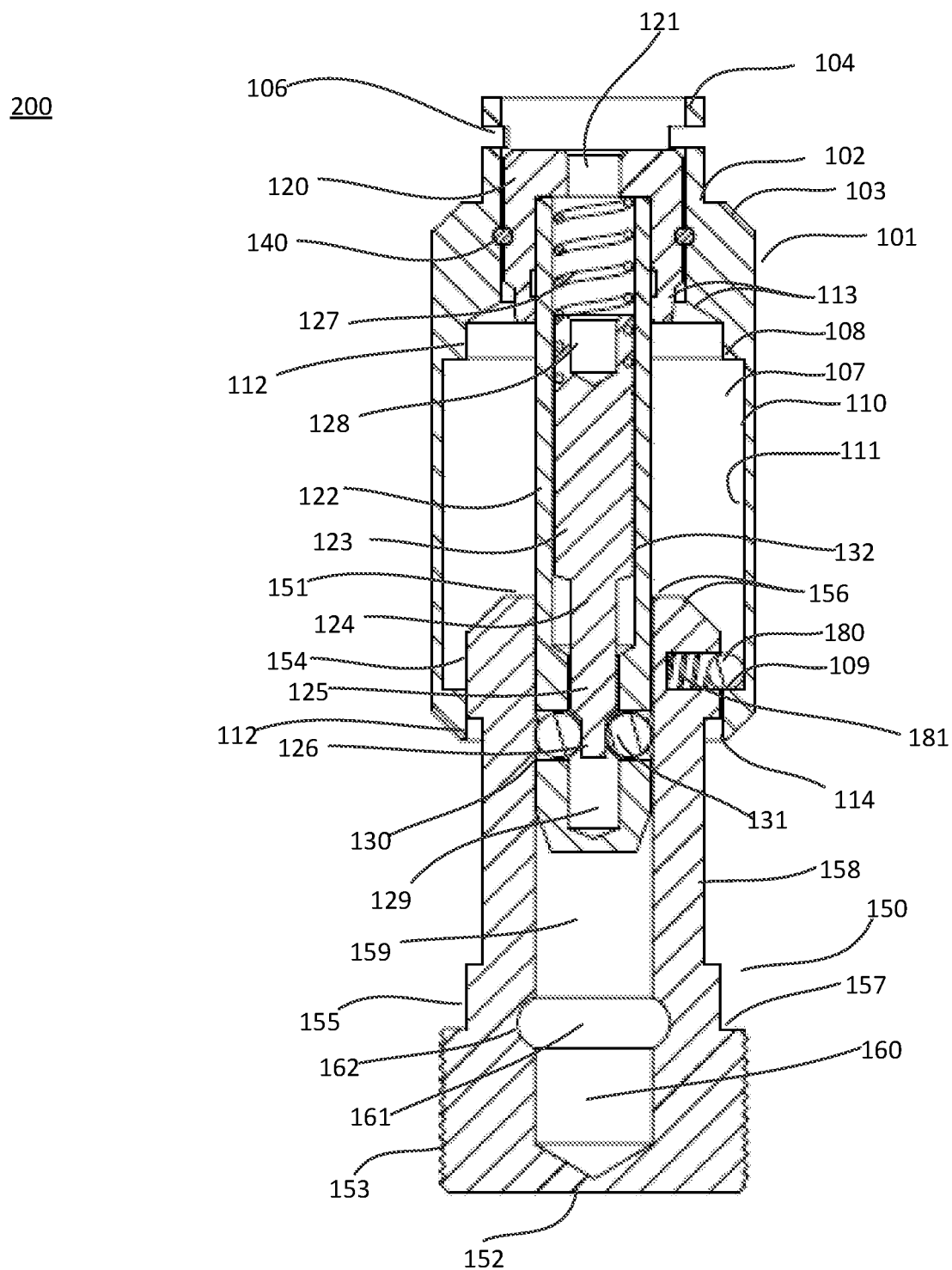
FIG. 2B is a cross sectional view of the security device of FIG. 2A, in an unlocked state.
Figure 2C:
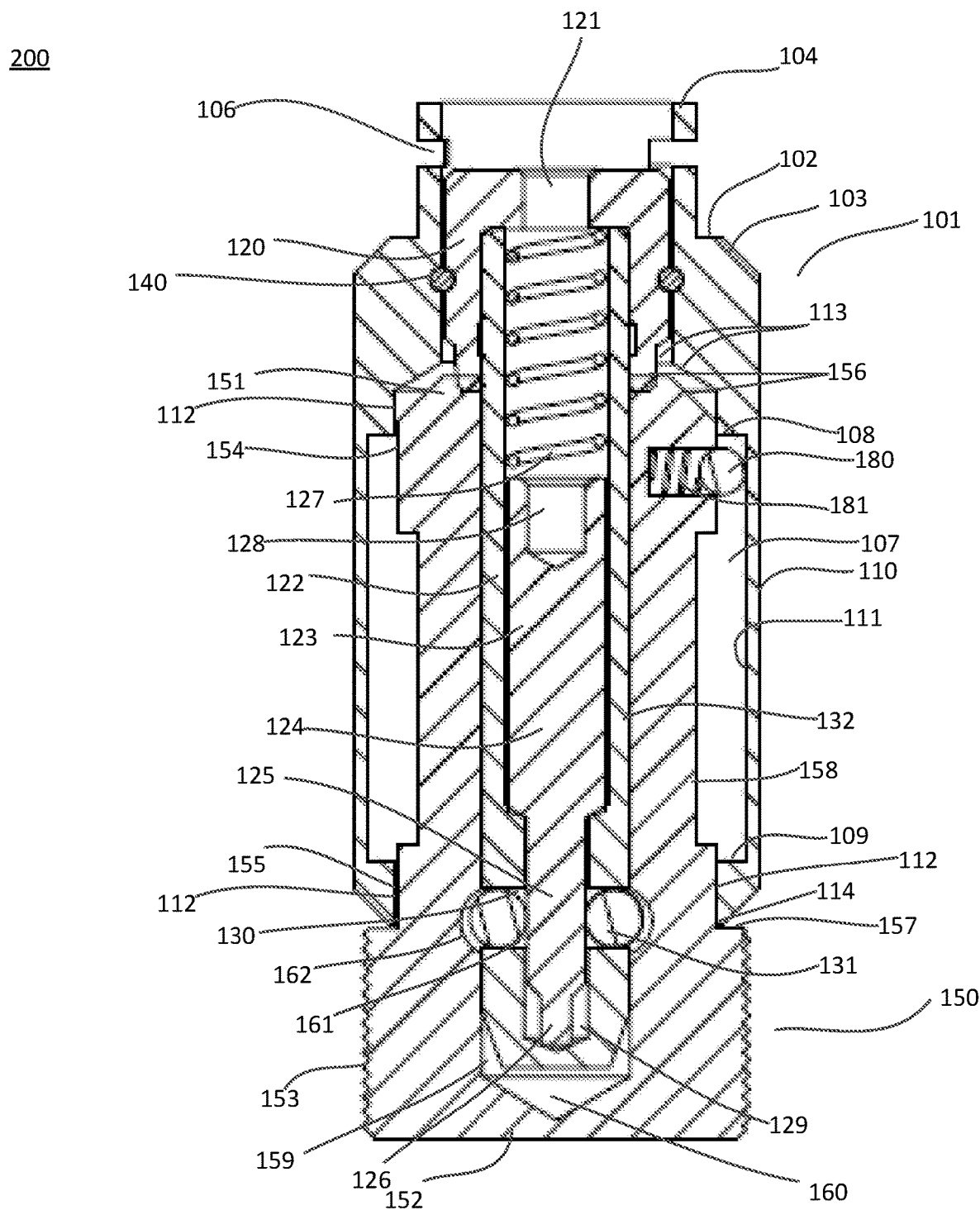
FIG. 2C is a cross sectional view of the security device of FIGS. 2A and 2B, in a locked state.

FIGS. 2A-2C depict cross sectional views of one example security device consistent with the present disclosure, in an assembly state (FIG. 2A), unlocked state (FIG. 2B), and locked state (FIG. 2C). As shown, the security device 200 includes a shroud 101, lock 120, and plug 150, wherein the lock 120 is coupled to shroud 101 via a coupling device 140. In this embodiment coupling device 140 is a snap ring, but lock 120 may be coupled to shroud 101 in any suitable manner. The shroud 101 has a generally circular or cylindrical profile, and includes a proximal end terminating in a head 104. The head 104 includes an optional slot 106, which may be utilized to house or support one or more tamper detection devices, such as a tamper detection seal or band as discussed previously. In this embodiment the shroud 101 includes a shoulder 102 and a bevel 103, which transition from the head 104 to shroud sidewall 110. The shroud sidewall 110 extends distally towards the plug 150 to terminate at distal shroud abutment surface 114. The shroud sidewall includes an inward facing surface 111 and an outward facing surface (not labeled). The inward facing surface 111 faces or substantially faces an outward facing surface 132 of the barrel 122 of lock 120, such that a shroud cavity 107 is defined there between.

A medial portion of the shroud sidewall 110 is narrowed to define a channel (not labeled) between proximal shroud retention surface 108 and distal shroud retention surface 109, which extend perpendicular or substantially perpendicular to a long axis of shroud cavity 107. Shroud guide surfaces 112 are formed proximate to and extend perpendicular or substantially perpendicular to the proximal and distal shroud retention surface 108, 109. Shroud 101 further includes a proximal shroud abutment surface 113 proximate to proximal shroud retention surface 108.

In this embodiment lock 120 is in the form of a barrel lock that includes a keyway 121, a barrel 122, a lock shaft (not labeled) terminating with a blind bore 129 within the barrel 122, and a locking element actuator 123 within the lock shaft. The locking element actuator 123 in this embodiment is in the form of a generally circular or cylindrical plunger that includes a proximal portion 124 having a diameter D3, a medial portion 125 with a diameter D2, and a distal portion 126 with a diameter D1, wherein D3>D2>D1. The locking element actuator 123 further includes a key receiving recess 128 formed in the proximal end of proximal portion 124. The locking element actuator 123 is coupled to locking bias mechanism 127, which in this embodiment is a spring configured to apply a force to bias locking element actuator 123 towards keyway 121. Locking element actuator 123 is further configured such that it may move proximally and distally in the lock shaft within barrel 122 as security device is transitioned from an assembly state to an unlocked state, and from the unlocked state to a locked state, and vice versa. For example, the diameter D3 of the proximal portion of the locking element actuator is less than a diameter of the lock shaft, such that the locking element actuator 123 can slide within the lock shaft.

The lock 120 further includes a locking element carrier 130 and locking elements 131. In this embodiment the locking element carrier 130 is in the form of one or more through holes that extend through barrel 122, and the locking elements are in the form of two locking balls. The locking element carrier 130 and locking elements 131 are sized and otherwise configured such that locking elements 131 may move radially inward and outward in response to motion of locking element actuator 123, as described later. Of course, locking elements 131 are not limited to locking balls, and any suitable number of locking elements (e.g., 1, 2, 3, 4, or more) locking elements may be used. In embodiments, lock 120 is a barrel lock.

The plug 150 includes a plug proximal end 151, a plug distal end 152, and a plug sidewall. Threads 153 are formed proximate the plug distal end 152, and are generally configured to threadably engage with an external device, e.g., corresponding threads of a pipe or other conduit. The plug sidewall is at least partially defined by plug proximal guide surface 154 and plug distal guide surface 155. Plug 150 further includes plug proximal abutment surface(s) 156. In embodiments and as shown in various FIGS., the plug 150 includes a plug proximal abutment surface 156 that extends perpendicular to or substantially perpendicular to a plane of the plug sidewall or, more specifically, a plane of plug proximal guide surface 154. As also shown in various FIGS. the plug 150 may further include at least one plug proximal abutment surface 156 that extends at an angle from plug proximal guide surface 154. Plug 150 also includes at least one plug distal abutment surface 157, which extends perpendicular or substantially perpendicular from plug distal guide surface 155. In any case when the plug sidewall (or, more particularly, proximal and distal plug guide surfaces 154, 155) are circular or cylindrical, plug proximal and distal abutment surfaces 156, 157 may extend fully or partially around the circumference of the plug sidewall.

Plug 150 further includes one or more gripping surfaces 158. In the embodiment of FIGS. 2A-2C the plug 150 includes two gripping surfaces 158 in the form of flat regions formed in the otherwise cylindrical or circular plug sidewall. Of course the devices described herein are no limited to the use of two gripping surfaces, and any suitable number of gripping surfaces may be used. When two gripping surfaces 158 are used, however, in embodiments such surfaces are formed on substantially opposite sides of plug 150, so as to facilitate their engagement with a tool, such as a wrench. In embodiments, the at least gripping surface 158 includes and extends between a first shoulder and a second shoulder, wherein the first shoulder is disposed proximate plug proximal guide surface 154 and the second shoulder is disposed proximate plug distal guide surface 155.

Further and as shown in various FIGS., the plug 150 may have a generally circular or cylindrical shape, but may vary in diameter and/or circumference between the plug proximal end 151 and the plug distal end 152. For example, the plug 150 may have a first diameter d1 proximate to distal end 152 (e.g. between distal abutment surface 157 and distal end 152) and a second diameter d2 proximate the plug proximal end 151 (e.g., around proximal guide surface 154), wherein d2 is less than d1. In some embodiments, the diameter of the plug 150 around the proximal guide surface 154 is the same as or different from the diameter of the plug around the distal guide surface 155.

Plug 150 further includes a plug cavity 159 formed therein. In embodiments and as shown in various FIGS., the plug cavity 159 is defined by an inward facing surface (not labeled) of the plug sidewall, and includes a distal end 160 terminating in a blind bore. In the various described embodiments plug cavity 159 is in the form of a generally circular or cylindrical blind bore defined by an inward facing surface of a plug sidewall of plug 150. A locking element receiver 161 is formed within the plug cavity 159. In various embodiments the locking element receiver 161 is in the form of a circumferential groove that has a diameter larger than the diameter of the distal end 160, as shown. The locking element receiver 161 includes at least one locking surface 162 that is configured to receive and retain the at least one locking element 131 when the security device 200 is in the locked state. While various FIGS. depict locking element receiver 161 and locking surface 162 as being in the form of a hemispherical groove around the inner circumference of plug cavity 159, it should be understood that such a configuration is for the sake of example only. Any suitable locking element receiver and/or locking surface may be used as locking element receiver 161 and locking surface 162, as would be understood by those of skill in the art.

Plug cavity 159, the plug sidewall (or, more particularly, plug proximal and distal guide surfaces 154, 155), lock 120, and shroud cavity 107 are configured such that barrel 122 may be inserted and slid within the plug cavity 159 along axis A, while plug proximal and distal guide surfaces 154, 155 are inserted and slid within shroud cavity 107. Thus, in some embodiments the barrel 122 may have an external diameter than is sized to fit within an internal diameter of plug cavity 159, allowing barrel 122 to be slid within the plug cavity 159. Similarly, plug proximal and distal guide surfaces 154, 155 may have dimensions that are complementary to the dimensions of shroud cavity 107, such that they can be received and slid within shroud cavity 107 as the security device 200 is transitioned between states.

The security device 200 further includes at least one retention element 180 that is configured to retain at least a portion of plug 150 within the shroud cavity 107 while the security device 200 is in an unlocked state. Put differently, the at least one retention element may retain the plug, lock, and shroud in an assembled but unlocked state, even when the locking elements 131 of lock 120 are disengaged from a locking receiver within plug cavity 159. In this embodiment the retention element 180 is in the form a retention ball that is biased by a retention bias mechanism 181 (e.g., a spring), and is located within a retention housing (e.g., a groove, not labeled) within plug proximal guide surface 154. The retention bias mechanism 181 is coupled to retention element 180, and is configured to urge retention element 180 radially outward towards inward facing surface 111 such that retention element 180 extends past the surface of plug proximal guide surface 154 and past shroud guide surfaces 112 when the security device 200 is in an unlocked or locked state. Retention element 180 may move within the groove/channel between the shroud proximal and distal retention surfaces 108, 109 as the security device 200 is moved from the unlocked state to the locked state, and vice versa. However, removal of the plug 150 from the shroud 101 is prevented because retention element 180 is captivated by shroud distal retention surface 109, as best shown in FIG. 2B.

For the sake of clarity and ease of understanding, the function and mechanical relationships of various components of the security device 200 will now be described as the security device is transitioned from the assembly state shown in FIG. 2A to the unlocked state shown in FIG. 2B, and then to the locked state shown in FIG. 2C. Security device 200 is illustrated in an assembly state in FIG. 2A. In that state, proximal end 151 of plug is inserted into shroud cavity 107, and barrel 122 of lock 120 is inserted into plug cavity 159. Plug 150 is positioned such that shroud guide surfaces 112 abut proximal guide surfaces 154. In that position retention element 180 is compressed against retention bias mechanism 181 by shroud guide surface 112, i.e., towards plug cavity 159. In addition, locking bias mechanism 127 biases locking element actuator 123 such that locking element actuator 123 is retracted towards head 104. In that position locking elements 131 abut a surface of distal portion 126 of locking element actuator 123. Put differently, retraction of locking element actuator 123 by locking bias mechanism 127 causes locking elements 131 to move radially inward through locking element carrier 130 (e.g., a through hole in barrel 122) until they contact distal portion 126. In that position, the entirety of locking elements 131 is located within the diameter of barrel 122 and, thus, within the internal diameter of plug cavity 159. Because retention element 180 is not within the channel between proximal and distal retention surfaces 108, 109, plug 150 may be fully withdrawn from shroud cavity 107.

By applying force along an axis extending through the barrel 122, shroud cavity 107, and plug cavity 159, the security device 200 can be moved from the assembly state of FIG. 2A to the unlocked state shown in FIG. 2B. In the unlocked state, plug 150 is positioned more proximally towards head 104 than it was in the assembly state. Most notably, retention element 180 has moved proximally past shroud guide surfaces 112. As a result, retention bias mechanism 181 urges retention element 180 into the channel extending between proximal and distal shroud retention surfaces 108, 109. Although not required. In embodiments the retention bias mechanism 181 also urges retention element 180 against the inward facing surface 111 of shroud sidewall 110. Once in that position, retention element 180 may move within the channel extending between proximal and distal shroud retention surfaces 108, 109, as security device 200 is moved from the unlocked state to the locked state, and vice versa. However, retention element 180 hinders or prevents separation of plug 150 from shroud 101 by interfering with shroud distal retention surface 109. More specifically, once security device 200 is in the unlocked state shown in FIG. 2B, retention element 180 prevents plug 150 from being moved further distal (relative to head 104) due to interference with shroud distal retention surface 109.

As may be appreciated, the embodiment of FIGS. 2A-2C is designed such that when it is in the unlocked state, separation of plug 150 from shroud 101 may be prevented unless the security device 200 is damaged. This is because in the illustrated embodiment, no features are provided that enable retention element 180 to be compressed towards plug cavity 159 once the assembly state has been attained. Such a design is of course for the sake of example, and features that can enable the security device to return to the assembly state can be included. For example, a through hole or other access port may be formed through shroud 101 near the shoulder formed by distal shroud retention surface 109 and shroud sidewall 110. When included, such a feature could allow a poke or other instrument to be inserted therein to compress retention element 180 towards plug cavity 159, thus allowing security device 200 to return to the assembly state. While such a configuration may be useful in some instances, it may not be desirable for all applications as the inclusion of such a through hole or port may reduce the amount of security provided by security device 200.

Figure 3A:
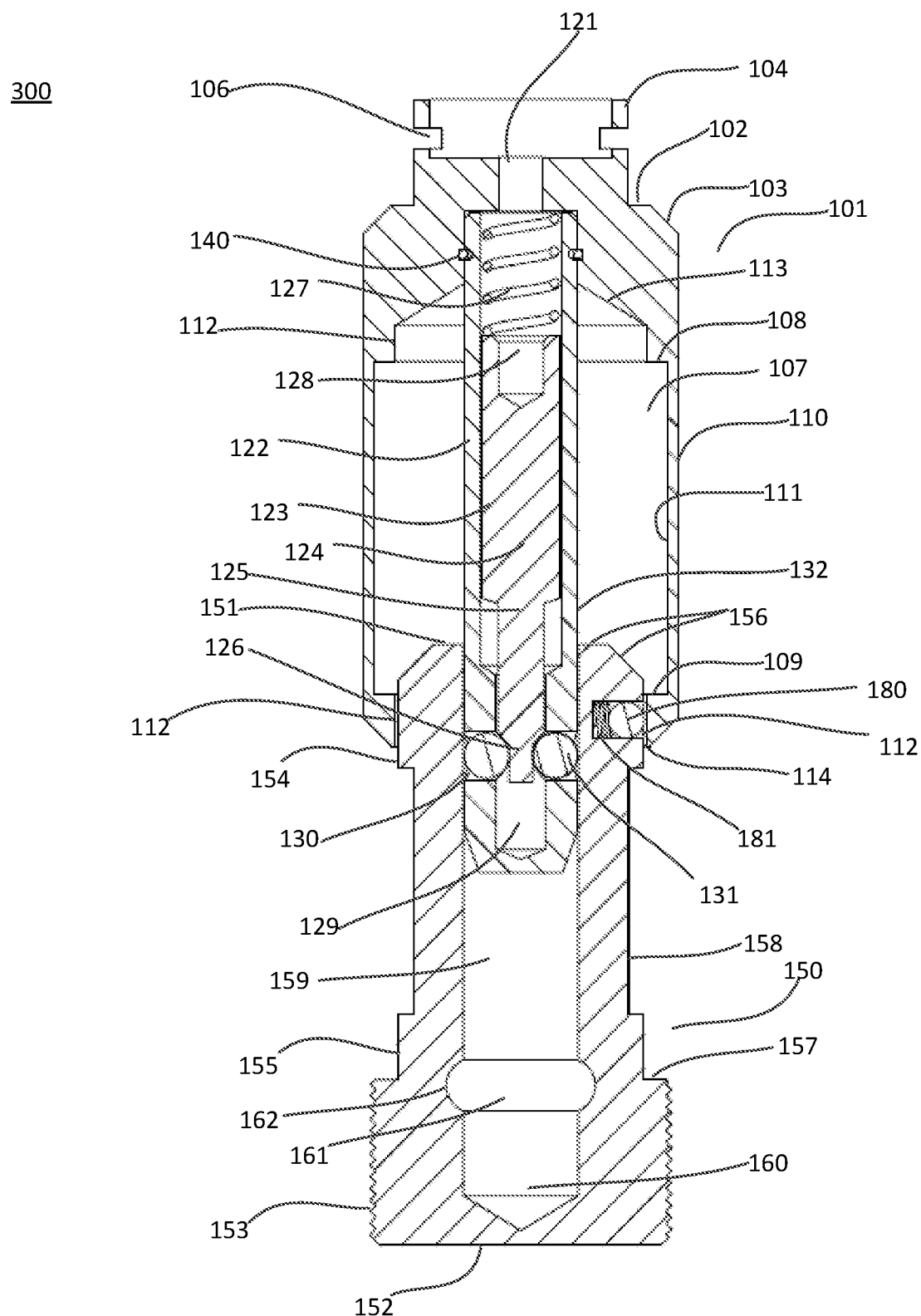
FIG. 3A is a cross sectional view of another example of a security device including a retained shroud, lock, and plug in an assembly state, consistent with the present disclosure.

Once the security device 200 is in the unlocked state of FIG. 2B, the security device 200 can be moved from the unlocked state of FIG. 2B to the locked state shown in FIG. 2C by applying force along an axis extending through the barrel 122, shroud cavity 107, and plug cavity 159 (e.g., along axis A towards distal end 152 as shown in FIGS. 1A-1I). During the transition to the locked state, retention element 180 rides within the channel between proximal and distal shroud retention surfaces 108, 109 until it is located close to or abuts distal shroud retention surface 109 as shown in FIG. 3A. Shroud guide surfaces 112 abut corresponding plug guide surfaces 154, 155, as shown. Plug proximal abutment surfaces 156 are disposed within shroud cavity 107 and close to or in contact with proximal shroud abutment surface(s) 113. Distal shroud abutment surface 114 is disposed close to or in contact with plug distal abutment surface 157.

During the transition from the unlocked state to the locked state, barrel 122 rides within plug cavity 159 towards distal end 152 until a distal end of barrel 122 is disposed proximate to distal end 160 of plug cavity 159. In addition, locking element actuator 123 moves distally until distal portion 126 is disposed within blind bore 129. Movement of the locking element actuator 123 urges the locking elements 131 radially outward through locking element carrier 130 and into engagement with locking element receiver 161 or, more specifically, locking surface 162. Locking elements 131 are maintained in that position by a surface of medial portion 125 of locking element actuator 123, and by a biasing force applied by locking bias mechanism 127 towards head 104—which causes a surface of locking element carrier 130 to urge the locking elements 131 against locking surface 162. In this embodiment locking bias mechanism 127 is in the form of a spring that is expanded while security device 200 is in the locked state shown in FIG. 2C, but which is constricted while security device 200 is in the unlocked state shown in FIG. 2B.

As shown in FIG. 2C, shroud sidewall 110 substantially or completely covers gripping surfaces 158 while security device 200 is in the locked state. Moreover, shroud 101 (or, more specifically, shroud sidewall 110) is continuously rotatable around plug 150 while security device 200 is in the locked state. As a result, rotation of shroud 101 (or, more specifically, shroud sidewall 110) does not result in corresponding rotation of threads 153. Moreover, shroud 101 hinders or prevents the engagement of tools (e.g., a wrench) with gripping surfaces 158. Accordingly, threads 153 of plug 150 may be threadably engaged with another device (e.g., corresponding threads of a pipe or conduit) using a wrench or other tools and gripping surface 158 while security device is in the unlocked state. Once threads 153 are so engaged, the security device may be advanced to the locked state, in which gripping surface 158 is fully or partially obscured by shroud sidewall 110. Because shroud 101 is continuously rotatable about plug 150, it may be quite difficult to remove security device 200 from the pipe or conduit while the security device 200 is in the locked state. Unlocking security device 200 causes shroud 101 to move towards head 104, exposing gripping surfaces 158—enabling easy removal of security device 200 with conventional tools.

Security device 200 may be returned to the unlocked state from the locked state via the use of a suitable key. For instance when lock 120 is in the form of a barrel lock, a barrel lock key may be inserted into key way until a distal end thereof is located within key receiving recess 128. At that point the distal end of the key may be expanded, such that the key grips a surface of the key receiving recess 128. Once so engages, a pulling force may be applied to the key. The combination of the pulling force and the bias force applied by locking bias mechanism 127 may be sufficient to retract locking element actuator 123 to the position shown in FIG. 2B. Retraction of the locking element actuator 123 to that position causes the locking elements 131 to move radially inward though locking element carrier 130, which in turn allows the barrel 122 to move proximally within plug cavity 159 towards head 104.

Figure 3B:
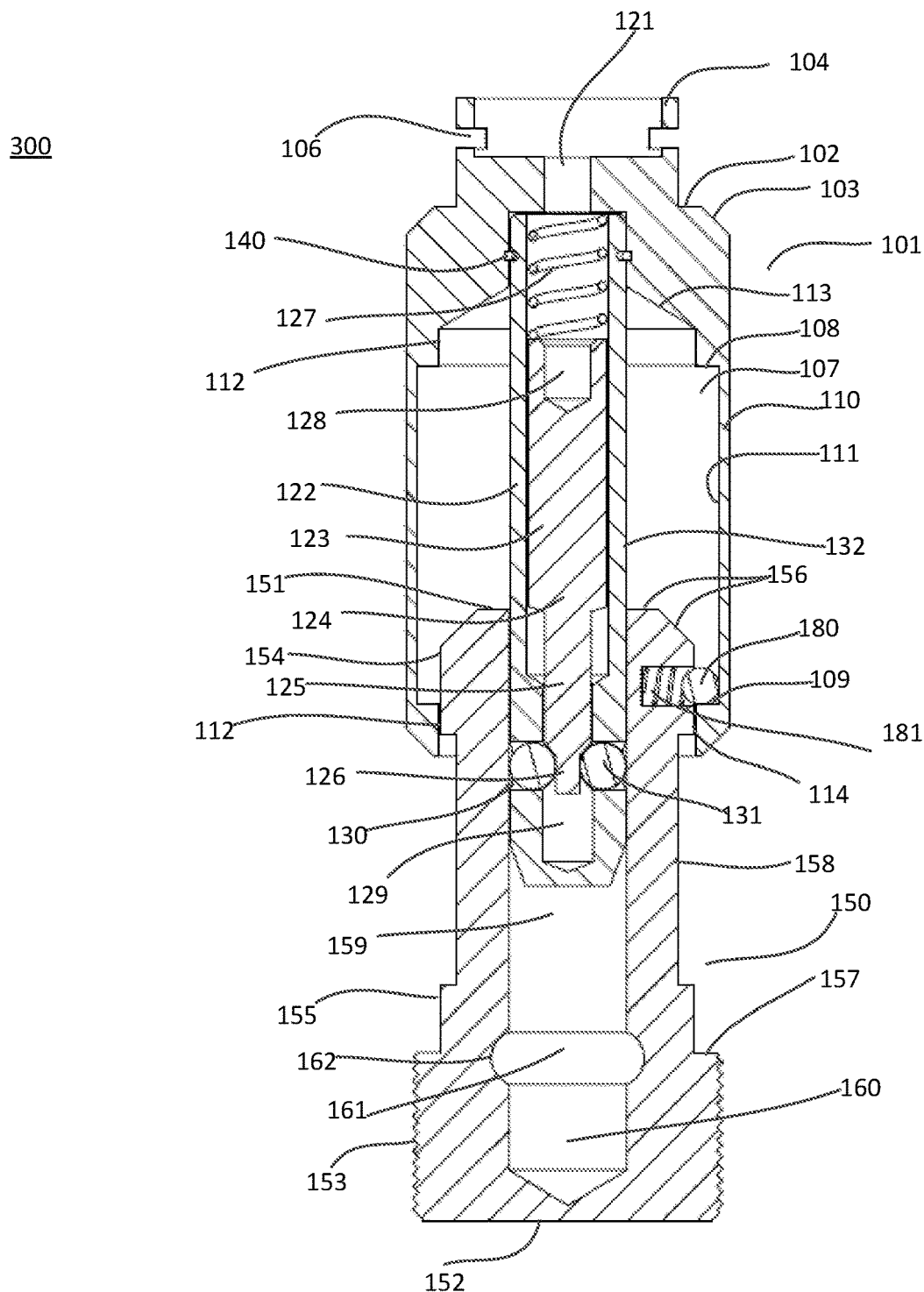
FIG. 3B is a cross sectional view of the security device of FIG. 3A, in an unlocked state.
Figure 3C:
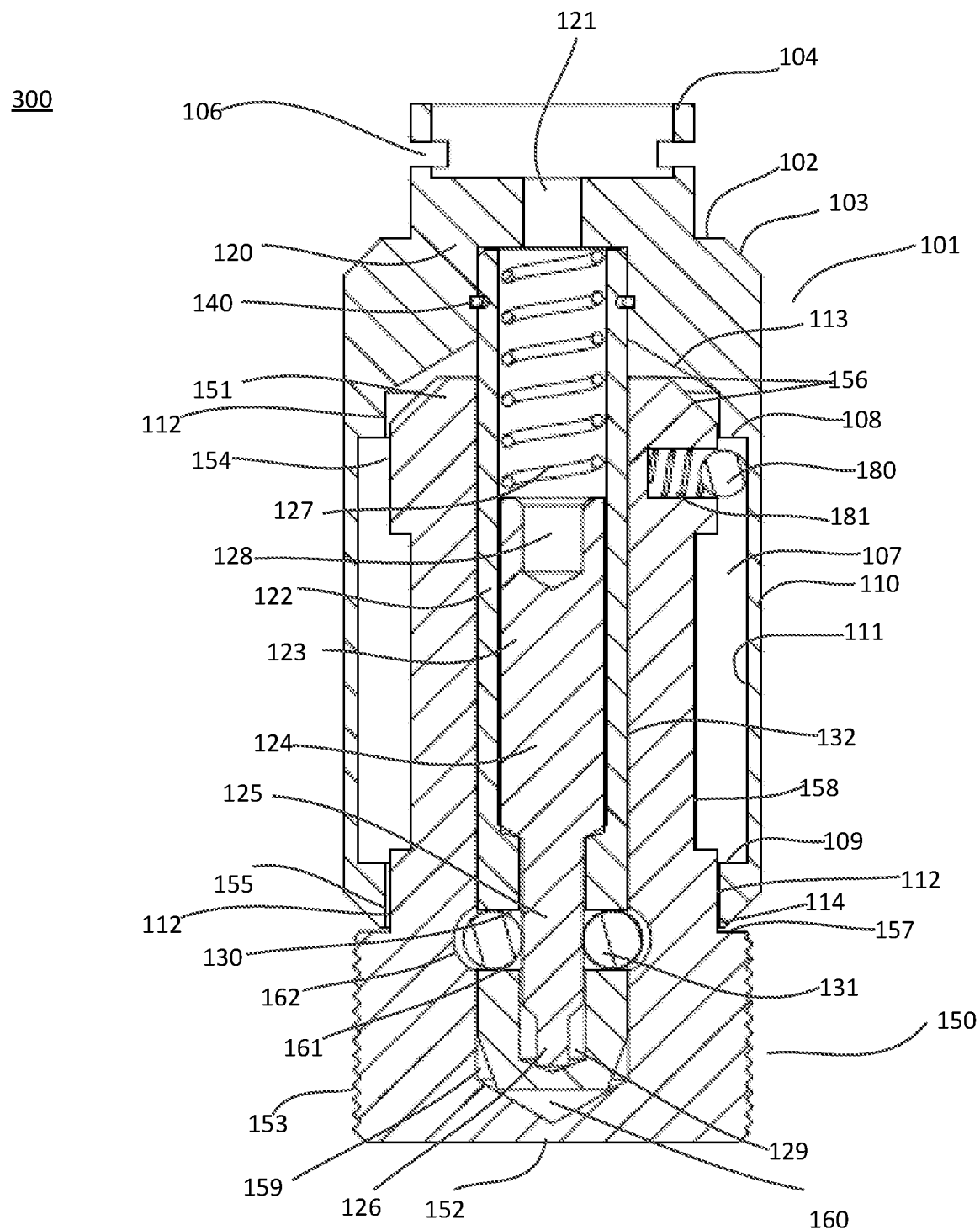
FIG. 3C is a cross sectional view of the security device of FIGS. 3A and 3B, in a locked state.

FIGS. 3A-3C depict another example of a security device consistent with the present disclosure in an assembly, locked, and unlocked state. Security device 300 includes many of the same elements as the security device 200 of FIGS. 2A-2C and, more generally, FIGS. 1A-1L. As the nature and function of those elements are the same as described above for security devices 200 and 100, in the interest of brevity they are not re-described. That being said, security device 300 differs from security device 200 in that it includes a different type of lock. Specifically, lock 120 in security device 200 is a barrel lock with a so called "D8" head, whereas lock 120 in security device 300 does not includes a D8 head. Otherwise, the nature and function of the elements of security device 300 is the same as the corresponding element of security devices 100, 200.

Figure 4A:
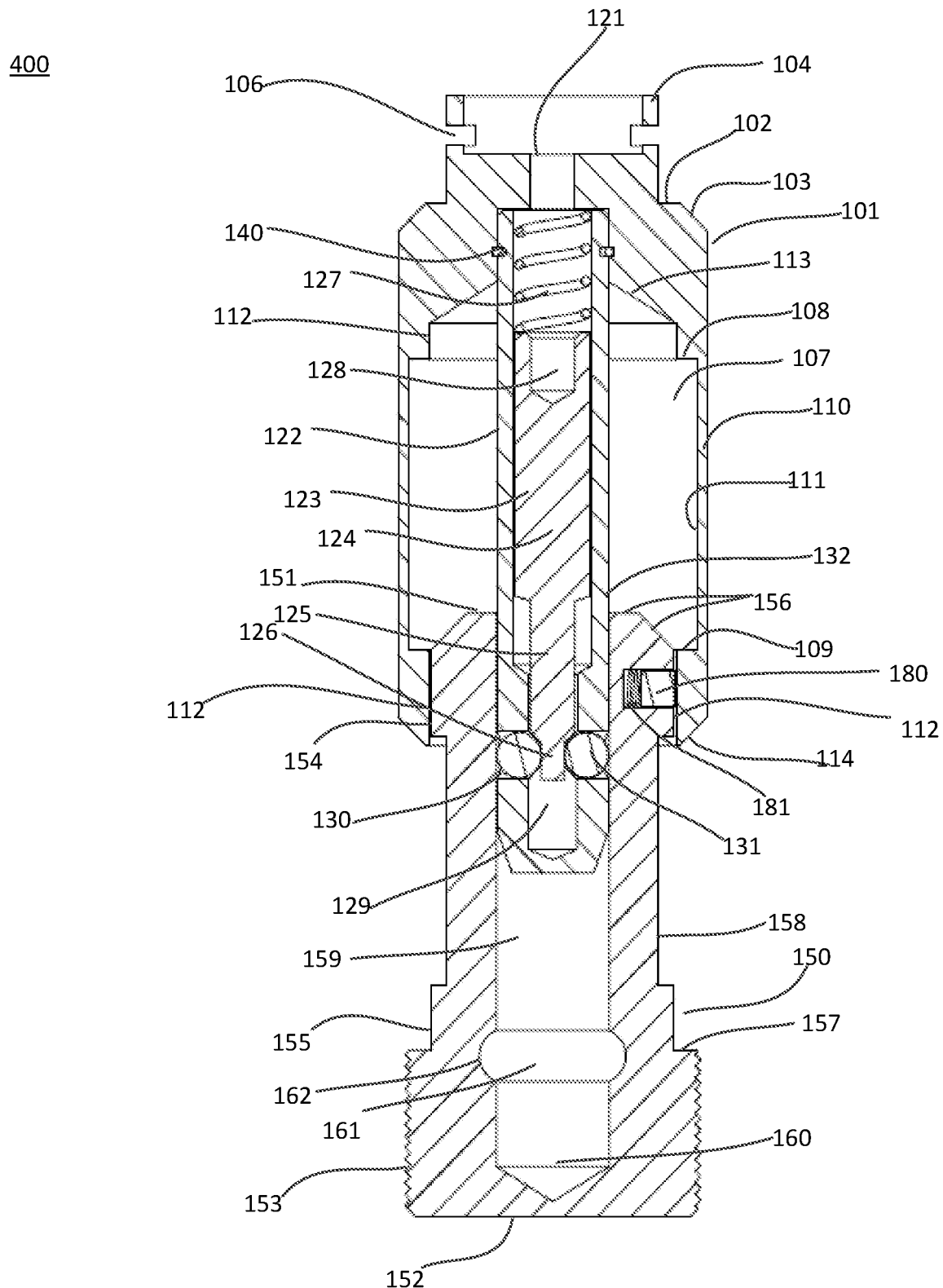
FIG. 4A is a cross sectional view of another example of a security device including a retained shroud, lock, and plug in an assembly state, consistent with the present disclosure.
Figure 4B:
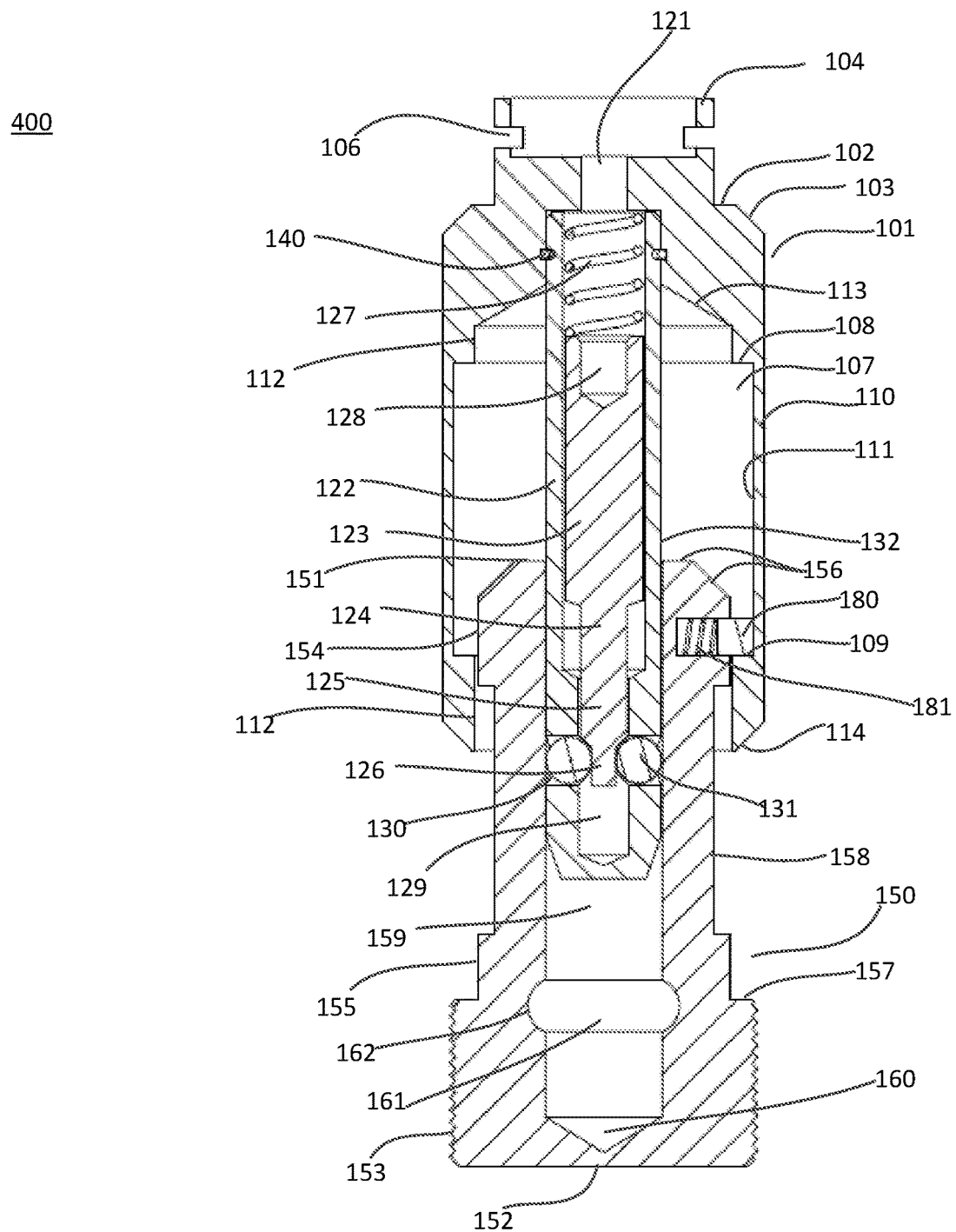
FIG. 4B is a cross sectional view of the security device of FIG. 4A, in an unlocked state.
Figure 4C:
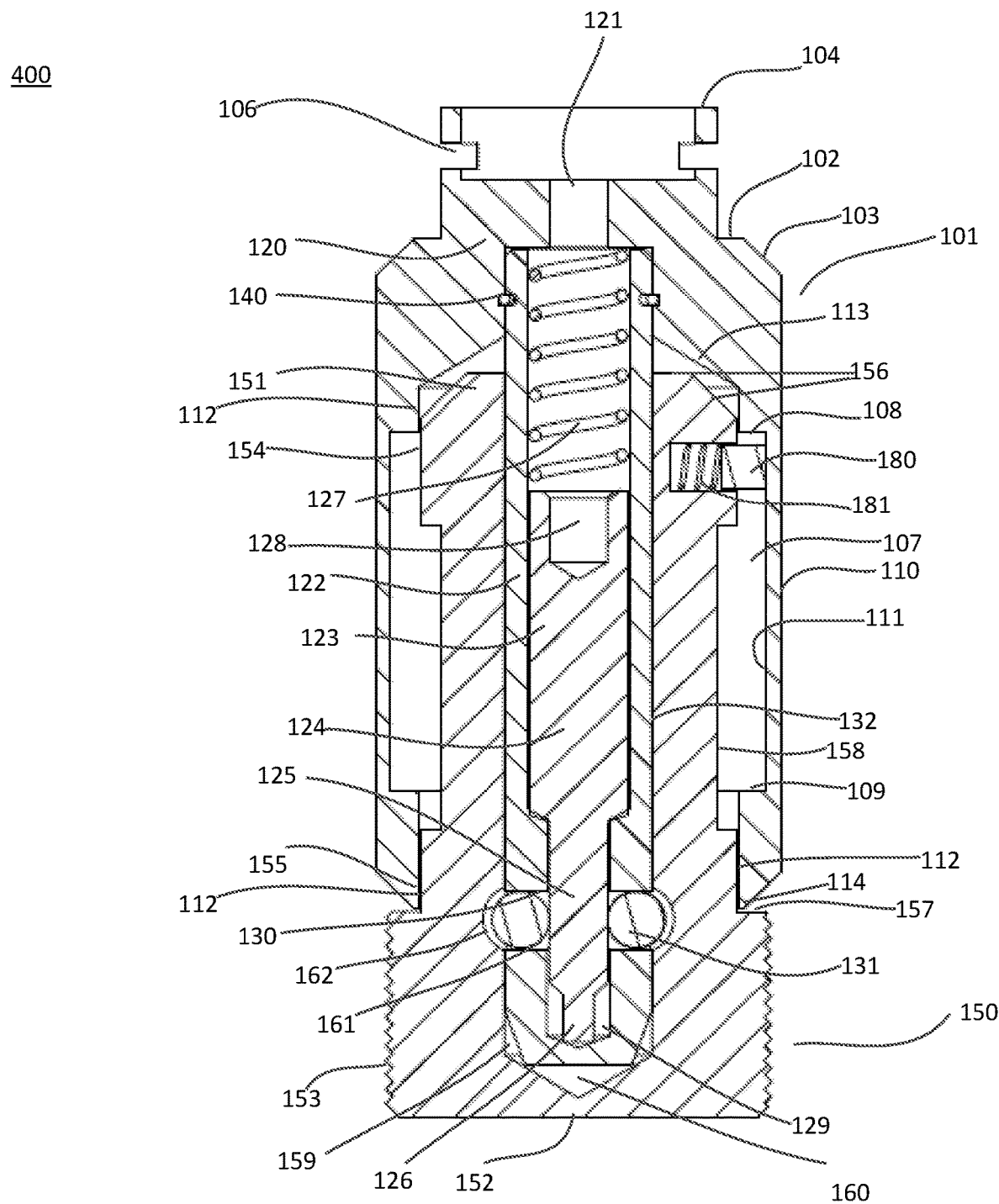
FIG. 4C is a cross sectional view of the security device of FIGS. 4A and 4B, in a locked state.

FIGS. 4A-4C depict another example of a security device consistent with the present disclosure in an assembly, unlocked, and locked state. Security device 400 includes the same elements as the security device 300 of FIGS. 3A-3C, except that retention element 180 is in the form of a retention pin, as opposed to a retention ball. The nature and function of all the elements of FIGS. 4A-4C is the same as described above with regard to security devices 100, 200, and 300. Thus, in the interest of brevity, the nature and function of the elements of security device 400 are not reiterated.

Figure 5A:
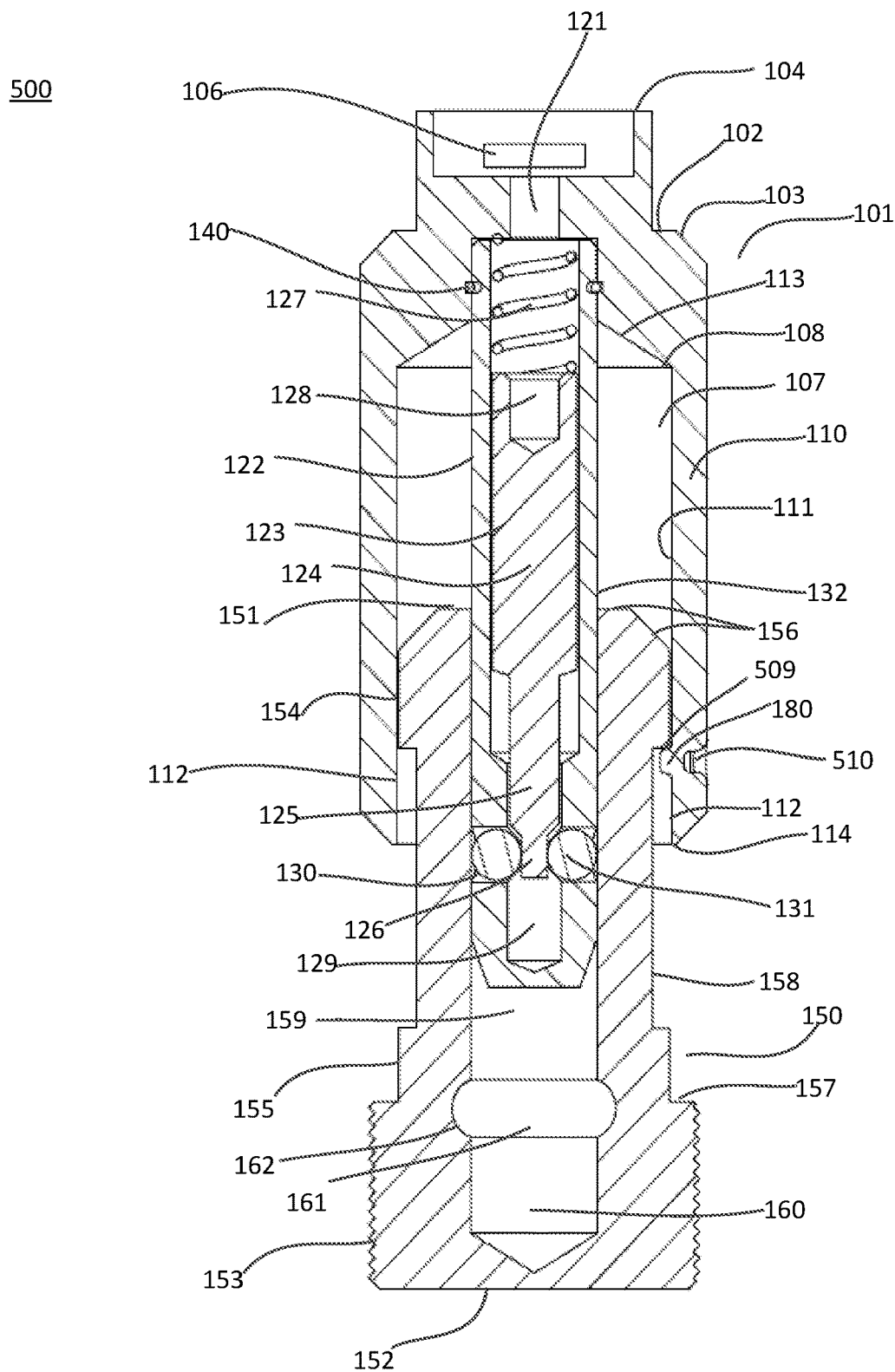
FIG. 5A is a cross sectional view of another example of a security device including a retained shroud, lock, and plug in an unlocked state, consistent with the present disclosure.
Figure 5B:
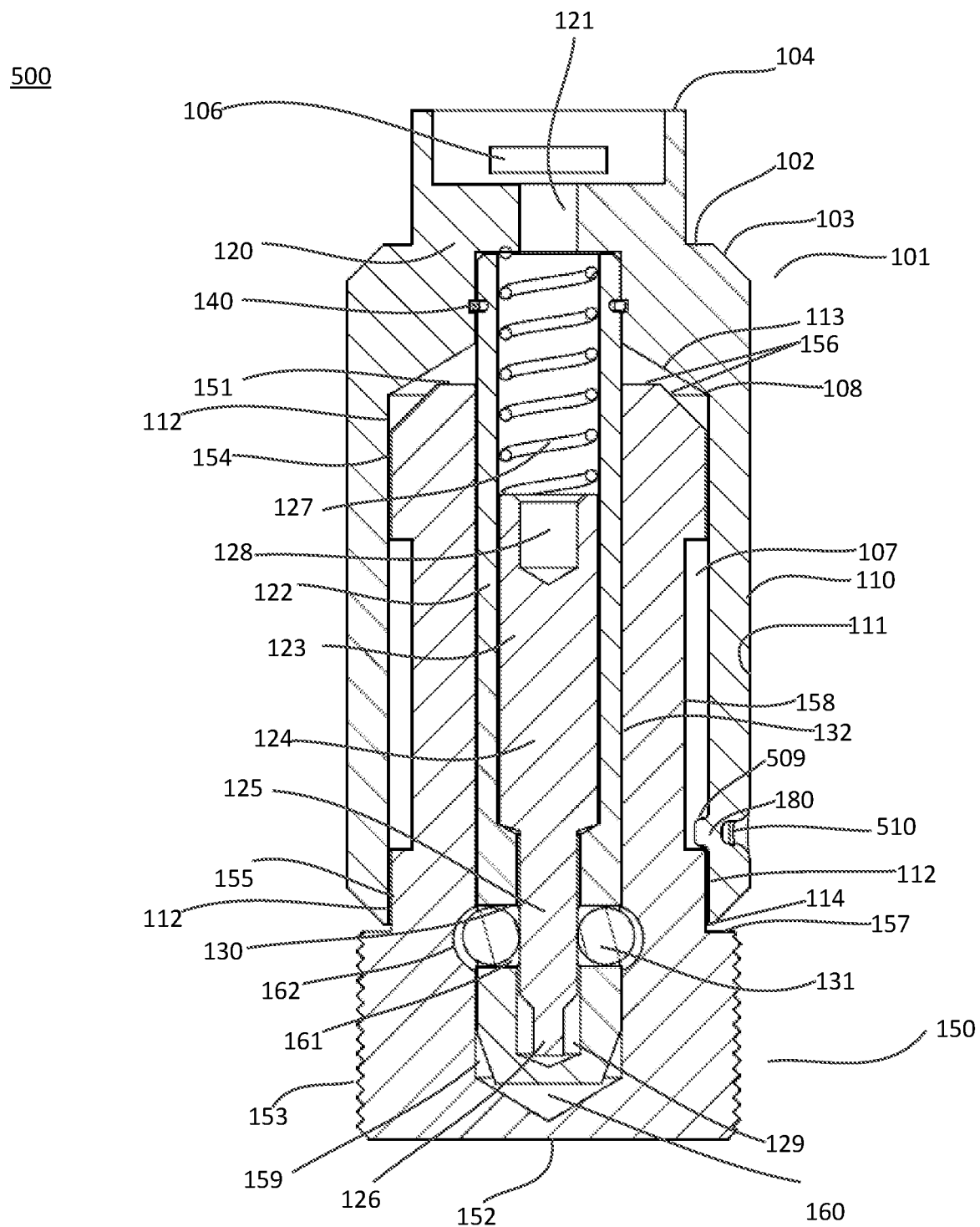
FIG. 5B is a cross sectional view of the security device of FIG. 5A, in an locked state.

FIGS. 5A and 5B depict another example of a security device 500 consistent with the present disclosure, in an unlocked and locked state. In this embodiment the nature and function of the plug 150 and lock 120 in security device 500 are the same as described above in connection with corresponding element of security devices 100, 200, 300, and 400, and so are not reiterated. Likewise, many of the elements of shroud 101 in security device 500 are the same as the corresponding elements of security device 100, 200, 300, and 400, and so are not reiterated. Security device 500 differs from the previously described security devices in that retention element 180 is part of shroud 101, whereas in other embodiments it is a separate element disposed on or within a portion of plug 150. More specifically, in security device 500 retention element 180 is in the form of a retention surface that is formed on or extends from a portion of the inward facing surface 111 of shroud sidewall 110. More specifically, in this embodiment retention element 180 is a bump that extends from the inward facing surface 111.

The bump (or other suitable retention surface) may be formed in any suitable manner, such as via extrusion, machining, welding, stamping, or the like. For example, in some embodiment security device 500 is formed by providing plug 150 as a separate component from lock 120 and shroud 101. Once shroud 101 and lock 120 are coupled (e.g., by a coupling device (e.g., a snap ring) 140 or some other means), proximal end 151 of plug 150 is disposed within shroud cavity 107, and barrel 122 is disposed within plug cavity 159. The plug 150 and barrel 122 are positioned relative to one another until distal abutment surface 114 is positioned over a portion of gripping surface 158. At that point, a groove 510 may be formed in an outward facing side of shroud sidewall 110 in any suitable manner, such as by pressing, roll forming, extruding, or the like. Formation of groove 510 may cause part of inward facing surface 111 to be displaced inward towards lock 120, resulting in the formation of a shroud distal retention surface 509. Shroud distal retention surface 509 may interfere with a shoulder formed at an intersection between gripping surface 158 and proximal plug guide surface 154, preventing plug 150 from being completely removed from shroud cavity 107.

As may be appreciated, once shroud distal retention surface 509 is formed, it may be quite difficult to separate plug 150 from shroud cavity 107 without damaging security device 500. However this design may streamline or simplify construction of shroud 101, which may be desirable for some applications.

Figure 6A:
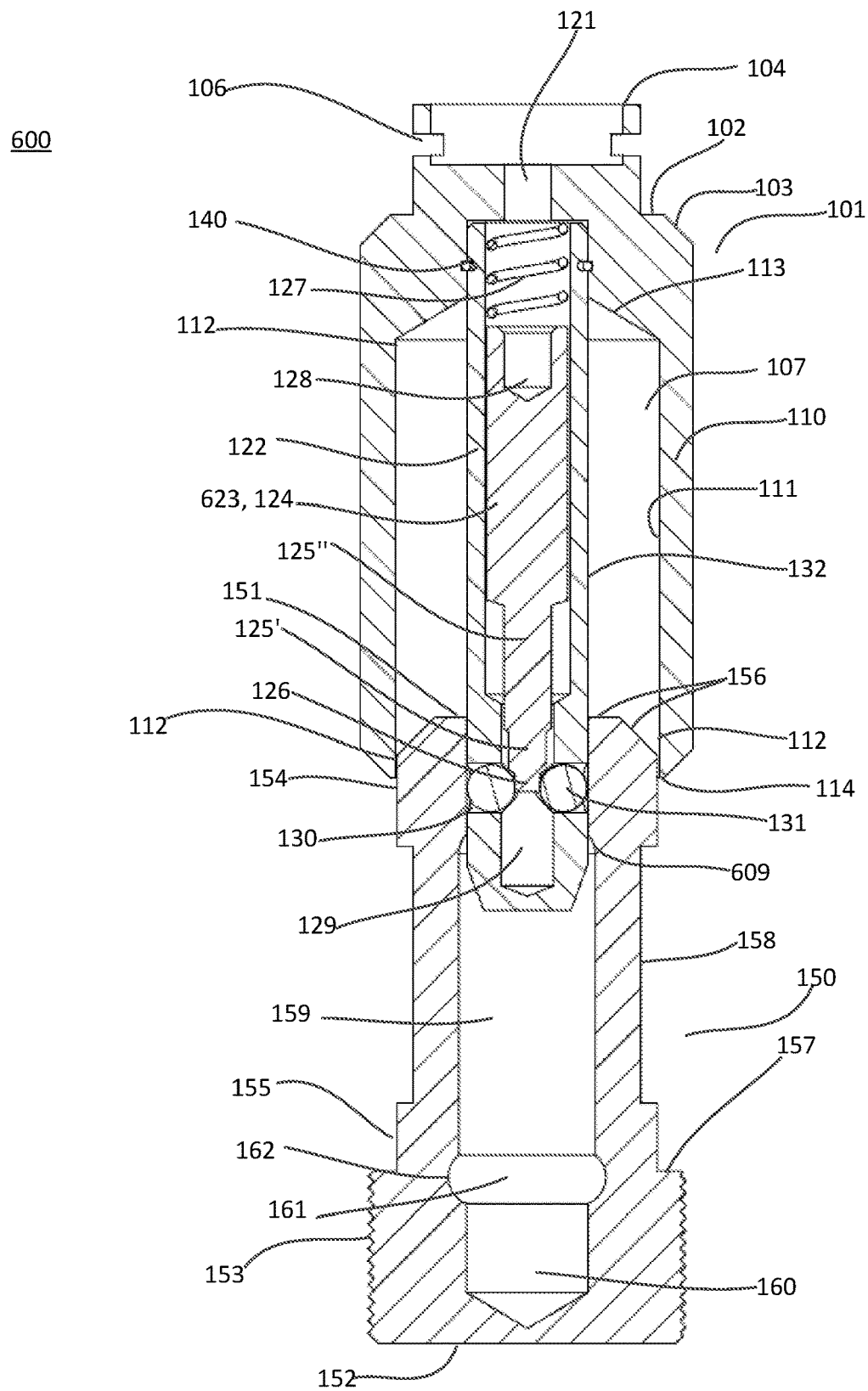
FIG. 6A is a cross sectional view of another example of a security device including a retained shroud, lock, and plug in an assembly state, consistent with the present disclosure.
Figure 6B:
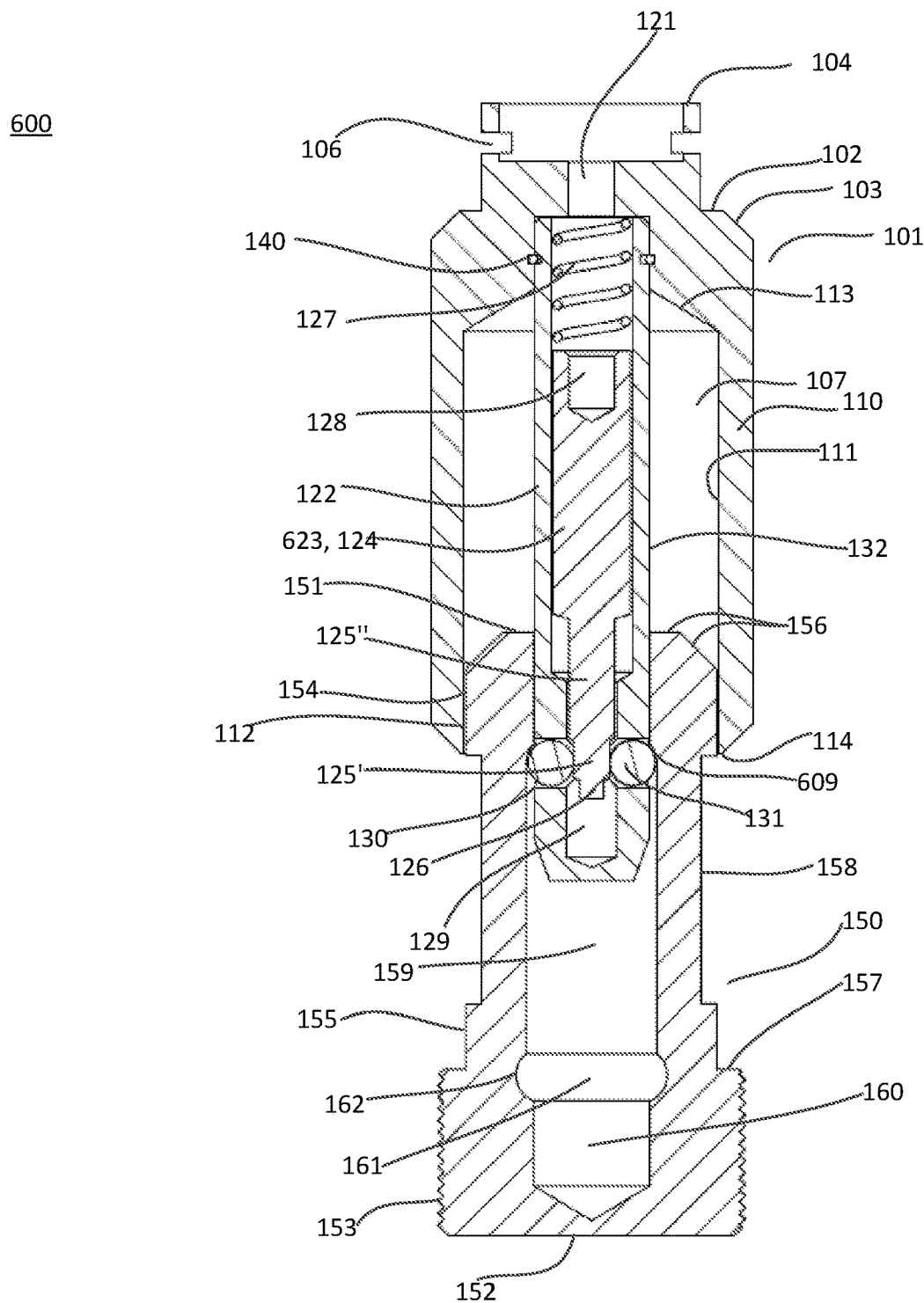
FIG. 6B is a cross sectional view of the security device of FIG. 6A, in an unlocked state.
Figure 6C:
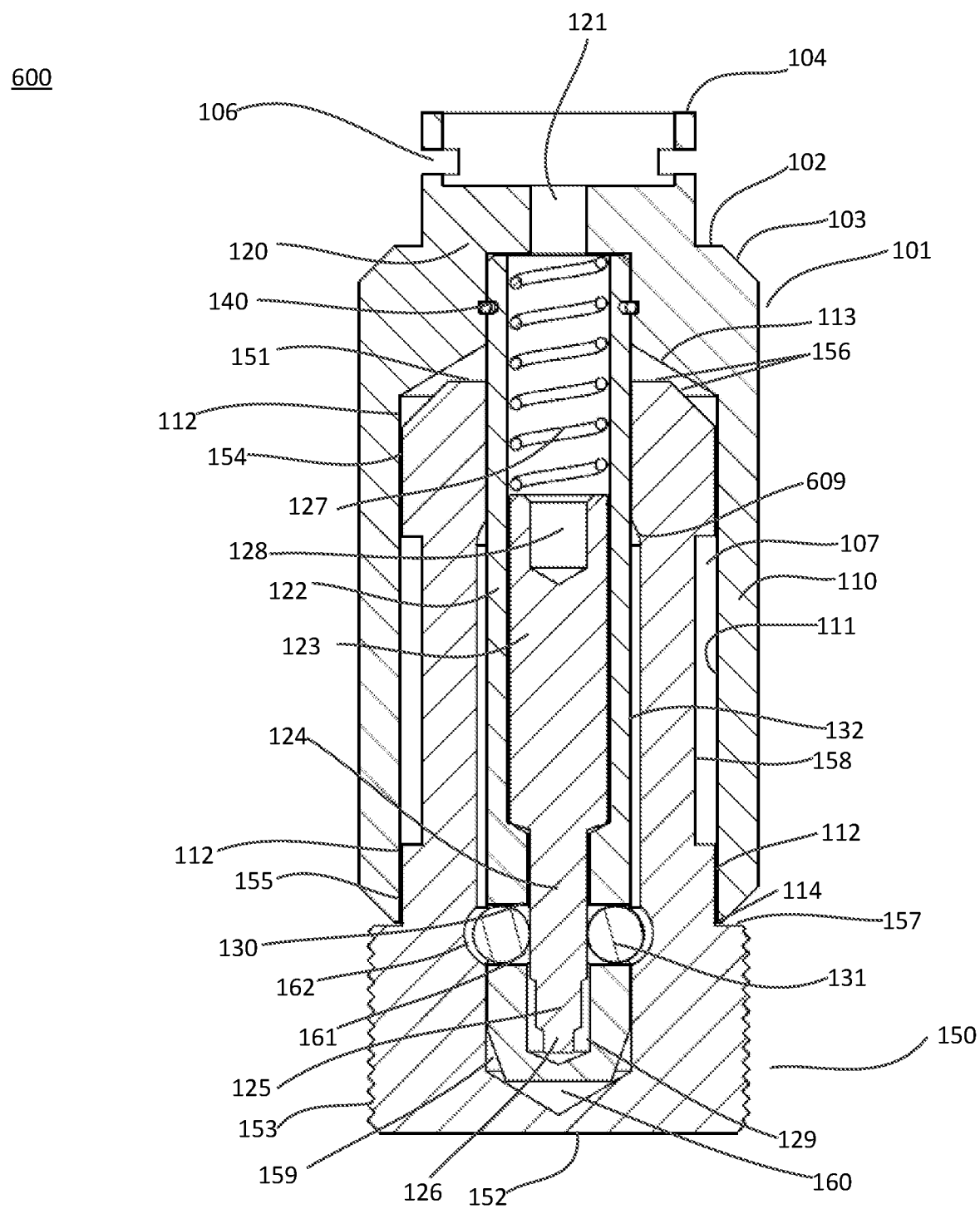
FIG. 6C is a cross sectional view of the security device of FIGS. 6A and 6B, in a locked state.

FIGS. 6A to 6C depict another example of a security device 600 consistent with the present disclosure, in an assembly state, unlocked state, and locked state. In this embodiment the nature and function of many of the elements of shroud 101, lock 120, and plug 150 are the same as described above regarding corresponding element of security devices 100, 200, 300, 400, and 500 and so are not reiterated. Security device 600 differs from the previously described security devices in that retention element 180 is a retention surface that is formed on or as part an inward facing surface defining plug cavity 159. This is in contrast to previous embodiments, wherein the retention element 180 was a retention plug or pin (FIGS. 2A-4C), or a retention surface on part of shroud 101 (FIGS. 5A-5B). Use of such a retention surface eliminates the need for proximal and distal retention surfaces 108, 109, as described in connection with other embodiments. Moreover, security device 600 differs from the other security devices described herein in that it utilizes a locking element actuator 623 that includes a distal portion 126 with a diameter D1, a proximal portion 124 with a diameter D4, a first medial portion 125' with a diameter D2 between the proximal portion 124 and distal portions 126, and a second medial portion 125" with a diameter D3 between the first medial portion 125' and the proximal portion 124.

More specifically and as shown in FIGS. 6A-6C, in security device 600 retention element 180 is in the form of a transition region between a proximal portion of plug cavity 159 and a distal portion of plug cavity 159. As such, plug cavity 159 includes a distal portion with a first diameter and a proximal portion with a second diameter, wherein the retention element 180 is in the form of a transition between the proximal and distal portions of the plug cavity 159, and the first diameter (of the proximal portion) of the plug cavity 159 is smaller than the second diameter (of the distal portion) of the plug cavity 159.

When security device is in the assembly state shown in FIG. 6A, barrel 122 is positioned within plug cavity 159 such that locking elements 131 are confined within locking element carrier 130 by the proximal portion of the plug cavity 159 and are in contact with distal portion 126 of locking element actuator 623. In that position the locking elements 131 are fully within the first diameter of the proximal portion of the plug cavity 159, and plug 150 may be completely removed from shroud cavity 107.

Security device 600 may be advanced from the assembly state of FIG. 6A to the unlocked state of FIG. 6B by the application of a force along an axis extending through the barrel 122, shroud cavity 107, and plug cavity 159. Application of such force causes the barrel 122 and locking element actuator 623 to move toward distal end 152 of plug 150, until locking elements 131 move past retention element 180 (i.e., the transition between the proximal and distal portions of plug cavity 159). Distal movement of the locking element actuator 623 causes first medial portion 125' to urge locking elements 131 radially outwards such that at least a portion of the locking elements 131 is exposed there through. At that point locking bias mechanism 127 applies a biasing force that biases locking element actuator 623 towards head 104. That biasing force causes the exposed portions of the locking elements into engagement with retention element 180. To return the security device 600 to the assembly state, a key may be inserted into keyway 121 and engaged with all or a portion of key receiving recess 128. Once so engaged, a force may be applied to the key to retract the locking element actuator 623. Retraction of the locking element actuator 623 may cause locking elements 131 to move radially inward through locking element carrier 130, until they contact distal portion 126—at which point the shroud 101, lock 120, and plug 150 may be returned to the assembly state.

The security device 600 may be advanced from the unlocked state of FIG. 6B to the locked state of FIG. 6C in much the same manner as described above in connection with security devices 100, 200, 300, 400, and 500. The one notable difference in this embodiment is that to advance security device 600 to the locked state, a force is applied along an axis extending through the barrel 122, shroud cavity 107, and plug cavity 159, so as to cause locking element actuator 623 to move further towards distal end 152. Such movement causes second medial portion 125" to urge locking elements 131 further radially outward through locking element carrier 130, such that they are retained within locking element receiver 161. Security device 600 may be returned to the unlocked state in the same manner described above in connection with other embodiments.

Figure 7A:
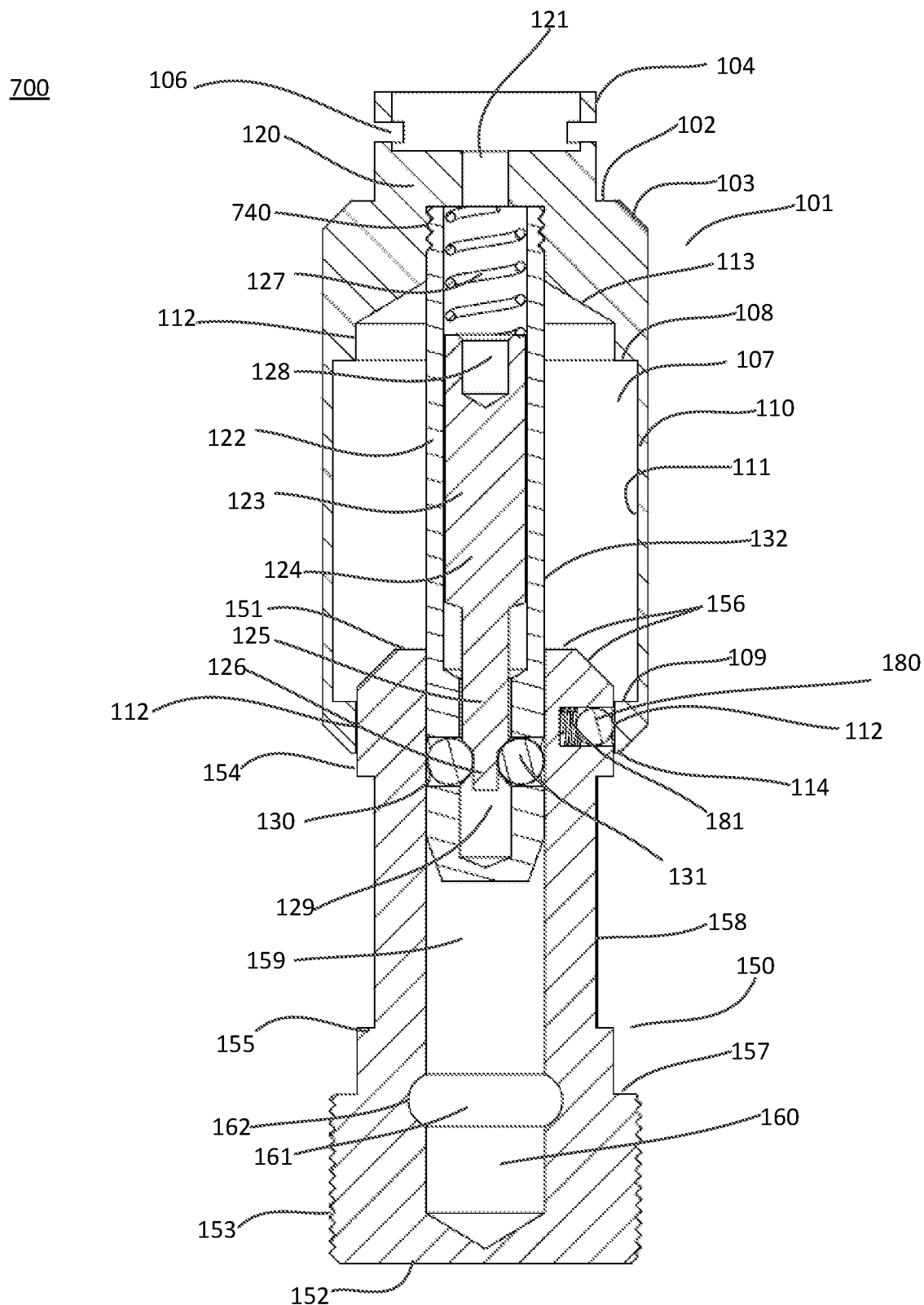
FIG. 7A is a cross sectional view of another example of a security device including a retained shroud, lock, and plug in an assembly state, consistent with the present disclosure.
Figure 7B:
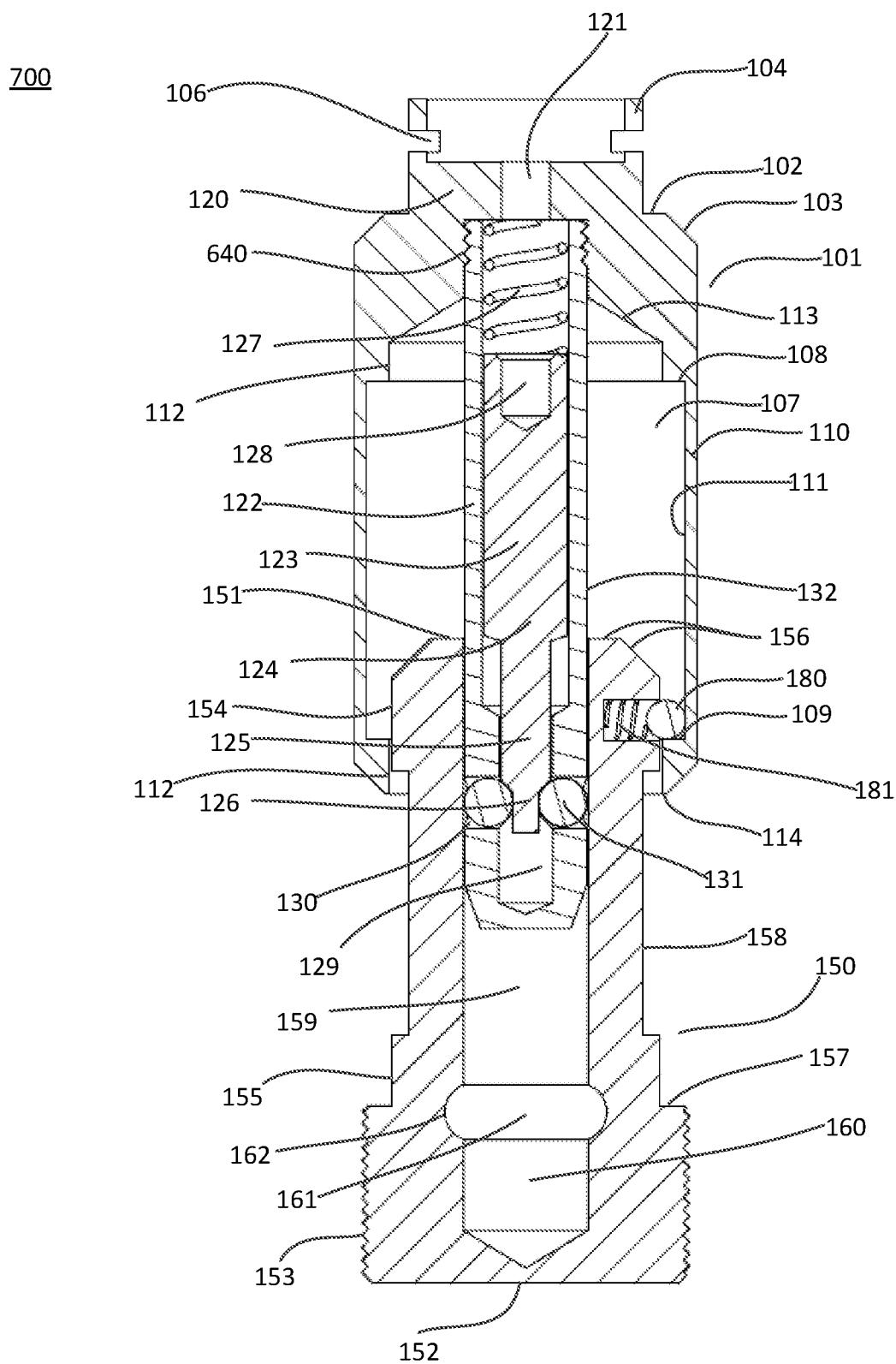
FIG. 7B is a cross sectional view of the security device of FIG. 7A, in an unlocked state.
Figure 7C:
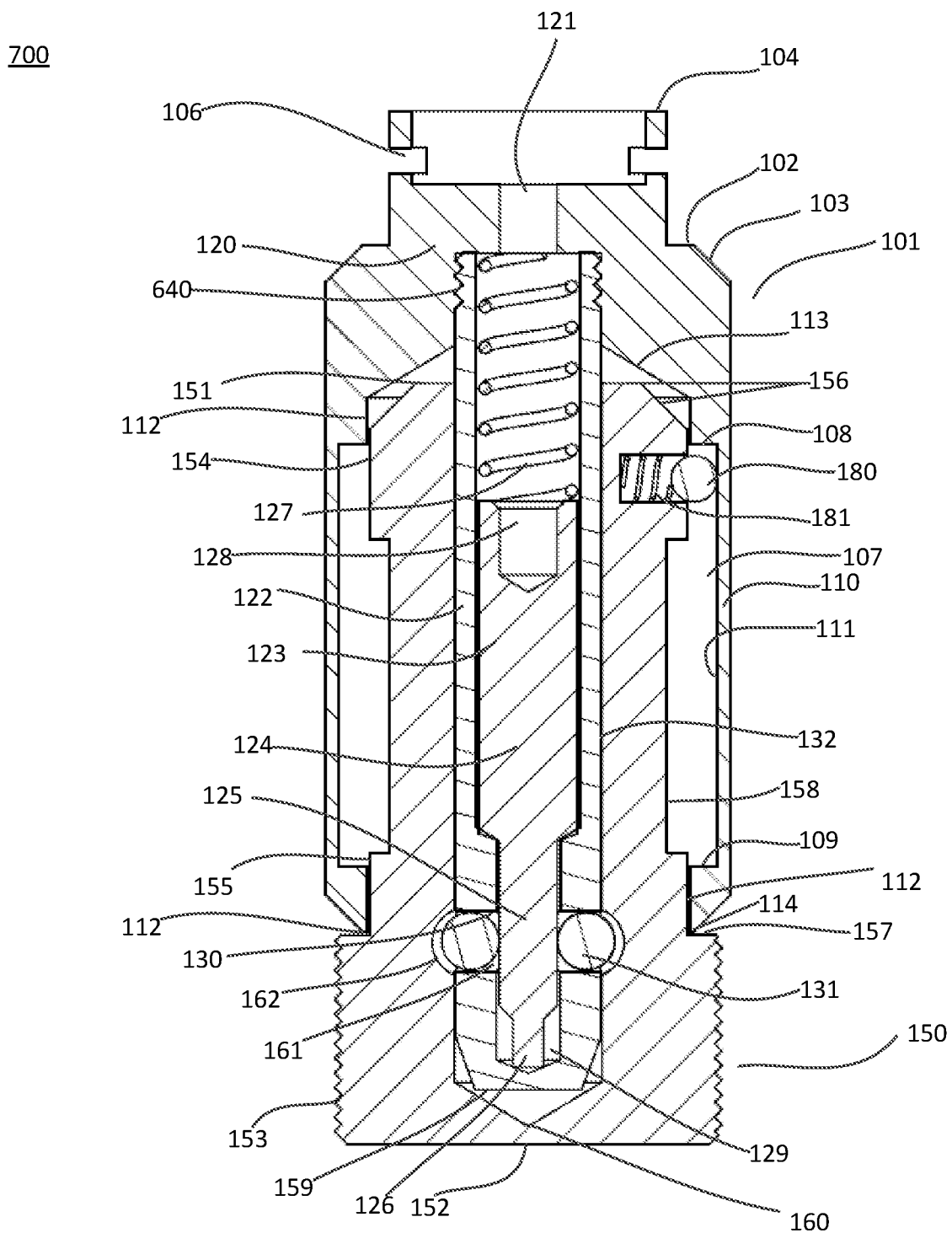
FIG. 7C is a cross sectional view of the security device of FIGS. 7A and 7B, in a locked state.

FIGS. 7A-7C depict another example of a security device consistent with the present disclosure in an assembly, unlocked, and locked state. Security device 700 includes the same elements as the security device 300 of FIGS. 3A-3C, except that lock 120 is coupled to shroud 101 in a different manner More specifically, in security device 700, lock 120 is coupled to shroud 101 by the engagement of threads 740 (formed in proximal portion of an outward facing surface of barrel 122) with corresponding threads formed in an inward facing surface of shroud 101. In contrast, lock 120 of security device 300 is coupled to shroud 101 by coupling device 140, which in this case is a snap ring. The nature and function of the other the elements of FIGS. 7A-7C is otherwise the same as the corresponding elements of security devices 100, 200, and 300. Thus, in the interest of brevity, the nature and function of the elements of security device 700 are not reiterated.

Figure 8A:
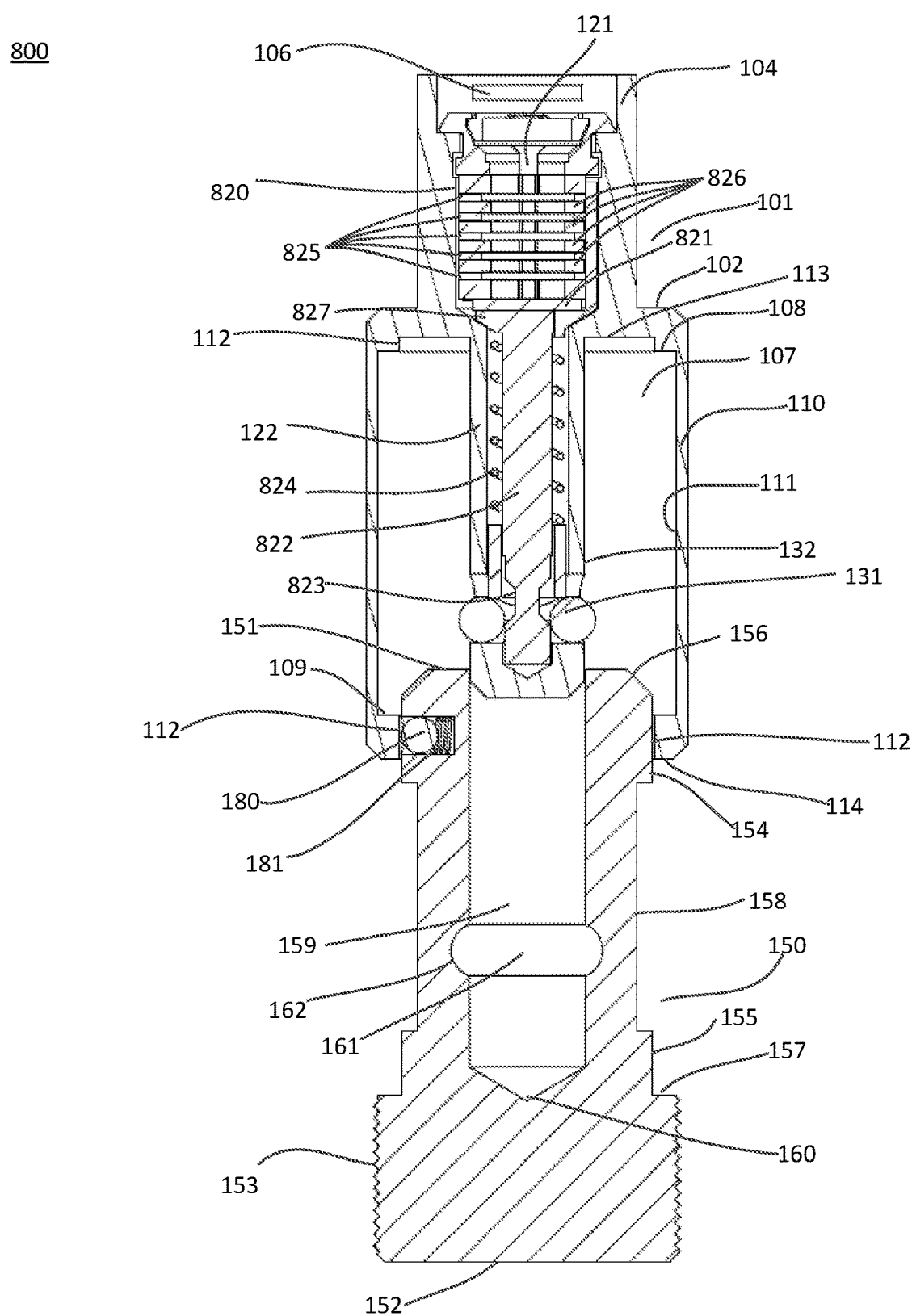
FIG. 8A is a cross sectional view of another example of a security device including a retained shroud, lock, and plug in an assembly state, consistent with the present disclosure.
Figure 8B:
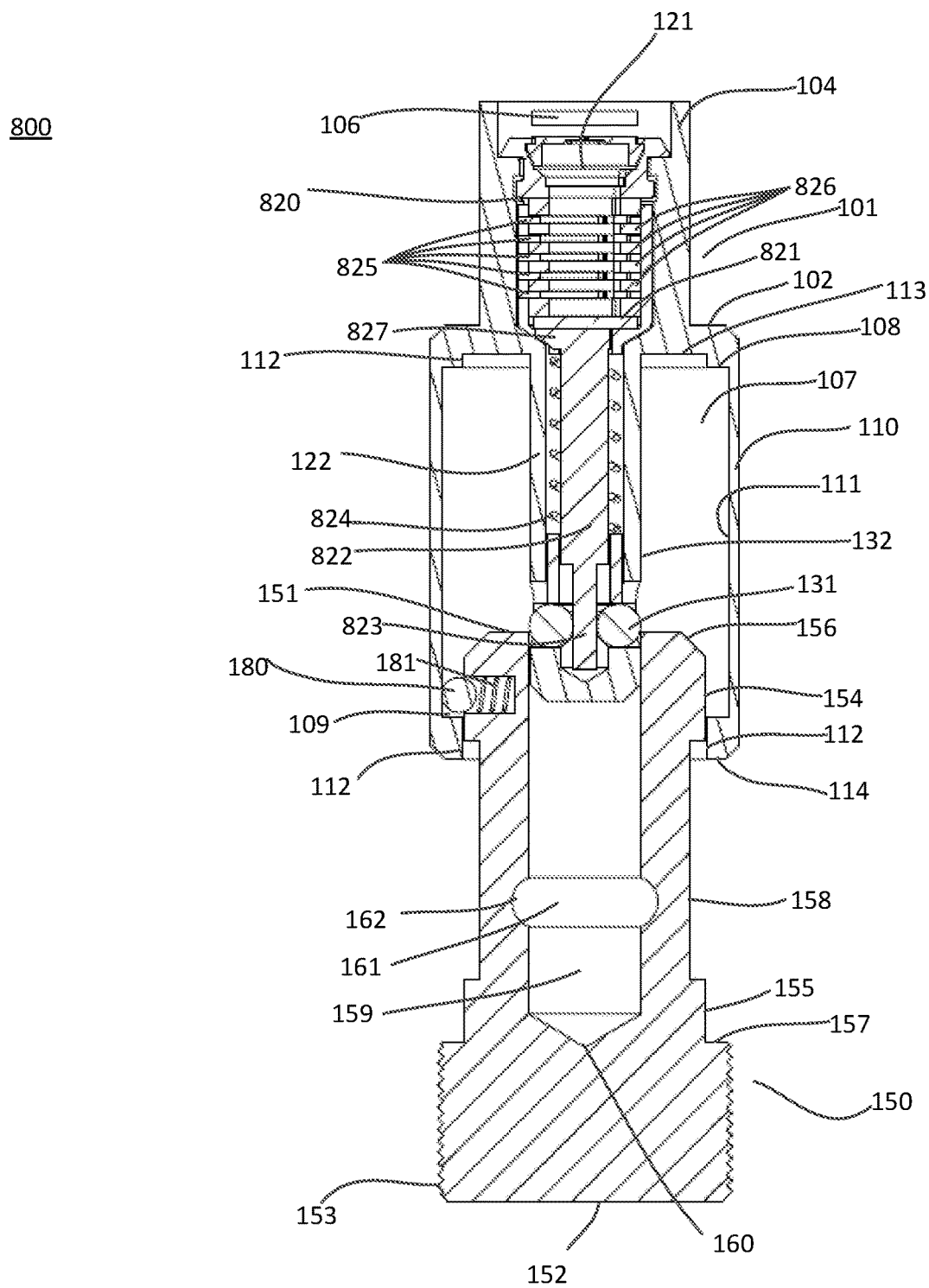
FIG. 8B is a cross sectional view of the security device of FIG. 8A, in an unlocked state.
Figure 8C:
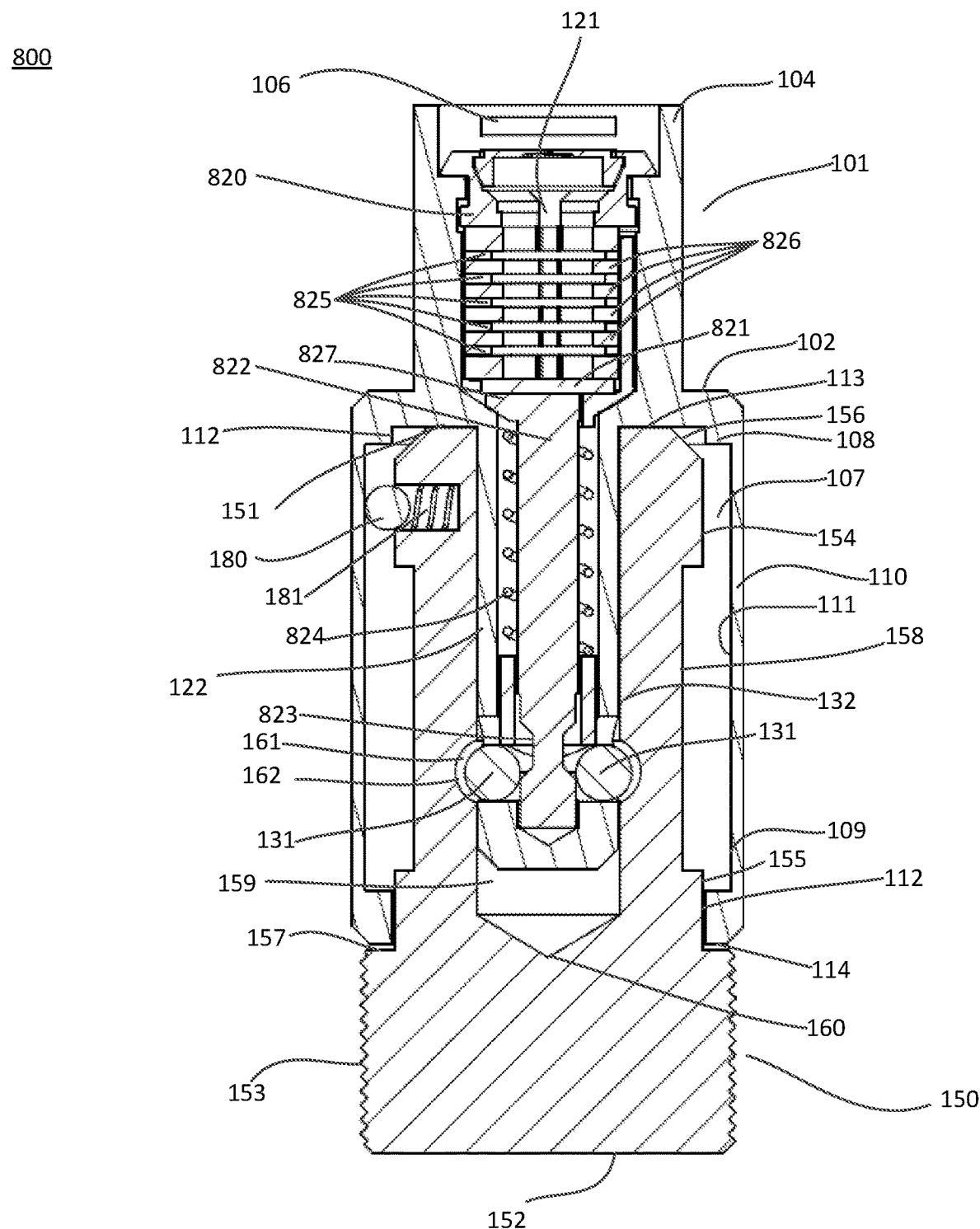
FIG. 8C is a cross sectional view of the security device of FIGS. 8A and 8B, in a locked state.

FIGS. 8A-8C depict another example of a security device consistent with the present disclosure in an assembly, unlocked, and locked state. Security device 800 is generally the same as security device 300 noted above, except that that it utilizes a different type of lock, and the lock is coupled to shroud 101 in a different manner More specifically, security device 800 includes a tumbler lock 820 (e.g., a disc tumbler lock) that is coupled to shroud 101 by virtue of its captivation between shroud 101 and one or more external surfaces near the head of tumbler lock 820, as generally shown in FIGS. 8A-8C. The tumbler lock 820 includes a rotor 821, a rotor stem 822, rotor stem flats 823, a spring 824, tumblers 825, spacers 826, and a tab 827. The nature and function of the tumbler lock 820 is well understood in the art, and so is not described in detail herein. Further details regarding the operation of tumbler lock 820 are provided in U.S. Pre-Grant Publication No. 2013/0000367, the entire content of which is incorporated herein by reference.

The operation of security device 800 is generally the same as security device 300, with the exception of the operation of tumbler lock 820. With that in mind, in the assembly state shown in FIG. 8A, proximal end 151 of plug 150 is inserted into shroud cavity 107, and barrel 122 is inserted into plug cavity 159. The plug 150 and shroud are positioned relative to one another such that retention element 180 (in this case, a retention ball biased by retention bias mechanism 181) is compressed by shroud guide surfaces 112.

Security device may be advanced to the unlocked state shown in FIG. 8B by the application of a force along an axis extending through barrel 122, shroud cavity 107, and plug cavity 159. Prior to the application of the force, rotor stem 822 is rotated, causing a corresponding rotation of rotor stem flats 823. Rotation of rotor stem 822 may be accomplished using a key inserted into keyway 121, as would be understood by those of skill in the art. Spring 824 is a compression spring that is configured to bias rotor stem flats 823 to the position shown in FIGS. 8A and 8C. Application of the force causes barrel 122 and shroud 101 to move towards distal end 152 of plug 150. Once retention element 180 is past distal shroud retention surface 109, retention bias mechanism 181 urges retention element radially outward towards the inward facing surface 111 of shroud sidewall 110, as previously described.

Security device 800 may be advanced from the unlocked state shown in FIG. 8B to the locked state shown in FIG. 8C in the much same manner as described above regarding security device 300, except that once barrel 122 is fully inserted within plug cavity 159, rotation of a key causes rotor stem flats 823 to turn—forcing locking elements 131 at least partially through locking element carrier 130 and into inter engagement with locking element receiver 161. Security device 800 may be returned to the unlocked state in much the same manner as described above with regard to security device 300, except that a key is used to rotate rotor stem flats 823. This also turn allows locking elements 131 to move radially inward and permits shroud 101 and barrel 122 to move proximally towards head 104, exposing gripping surfaces 158.

Figure 9:
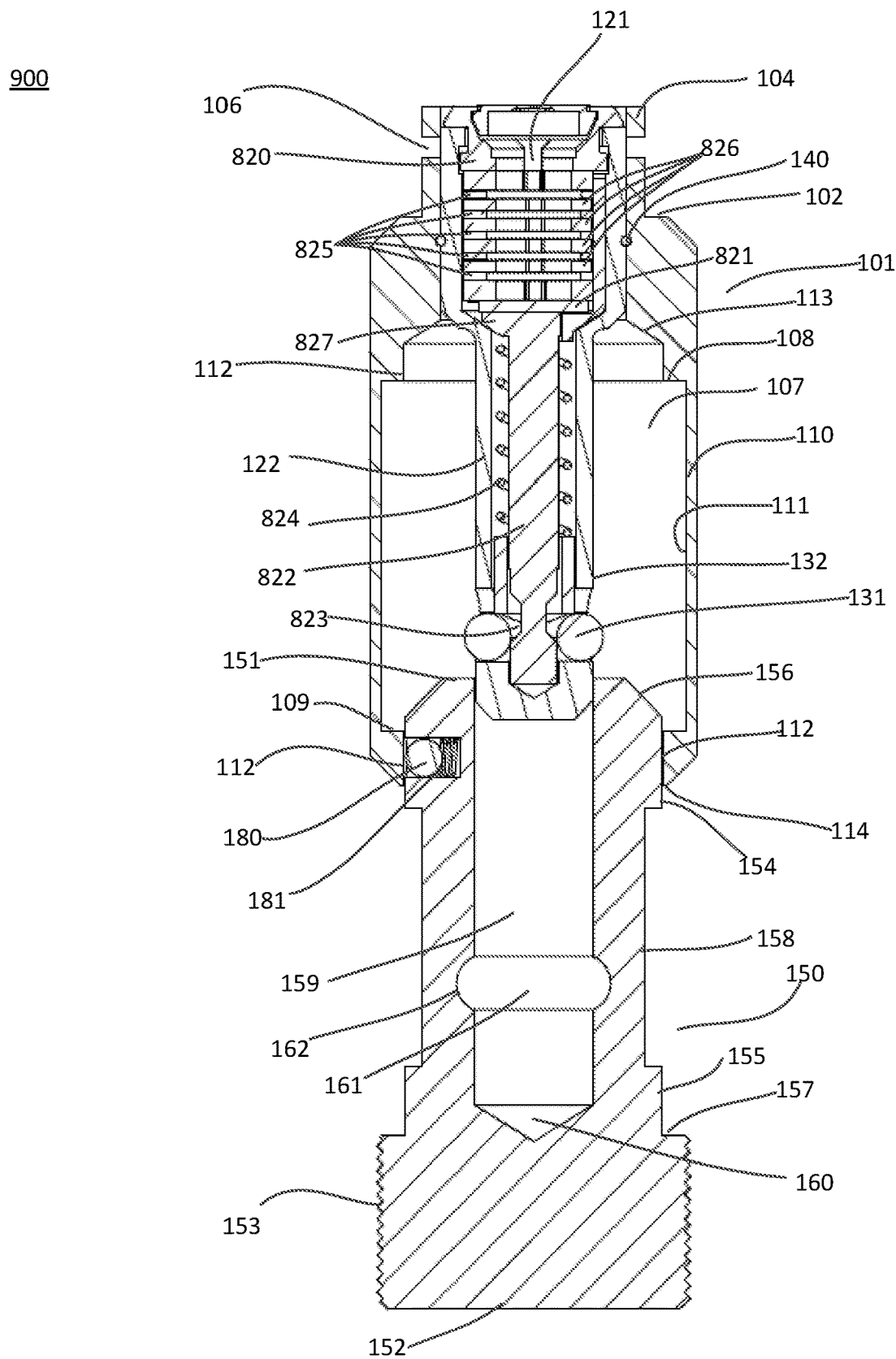
FIG. 9 is a cross sectional view of another example of a security device including a retained shroud, lock, and plug in an assembly state, consistent with the present disclosure.

FIG. 9 depicts another example of a security device consistent with the present disclosure in an assembly. Security device 900 is the same as security device 800, except that lock 820 is coupled to shroud 101 via coupling device 140 (e.g., a snap ring). Otherwise, security device 900 is identical to security device 800, and may be transitioned from an assembly state to an unlocked state and between the unlocked state and a locked state as described above.

Figure 10:
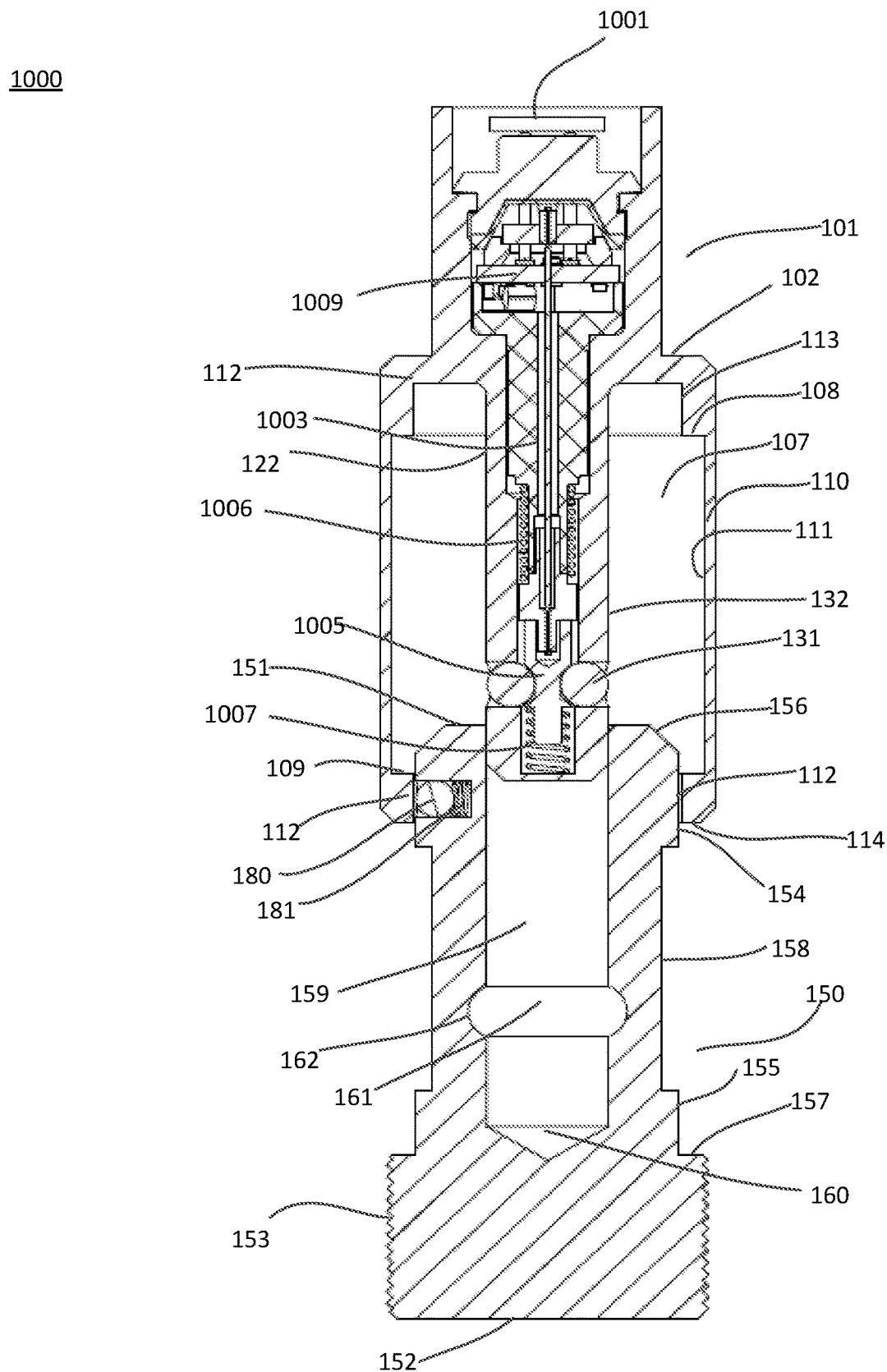
FIG. 10 is a cross sectional view of another example of a security device including a retained shroud, lock, and plug in an assembly state, consistent with the present disclosure.

FIG. 10 depicts another example of a security device consistent with the present disclosure in an assembly state. Security device 1000 is generally the same as security device 300 noted above, except that that it utilizes a different type of lock, and the lock is coupled to shroud 101 in a different manner More specifically, security device 1000 includes an electronic barrel lock that is captivated by shroud 101, e.g., between shroud 101 and one or more external surfaces near the head of the electronic lock as generally shown in FIG. 10. The electronic barrel lock includes, among other things, an electronic key interface 1001, a locking element actuator 1003 (in this case a made of or including one or more shape memory alloy (SMA) wires), a locking element driver 1005, a first bias member 1006, a second bias member 1007, and lock control circuitry 1009. The nature and function of the electronic lock in security device 1000 is described in detail in U.S. Pre-Grant Publication No. 2014/0260456, the entire content of which is incorporated herein by reference.

The operation of security device 1000 is generally the same as security device 300, with the exception of the operation of the electronic barrel lock. With that in mind, in the assembly state shown in FIG. 10, proximal end 151 of plug 150 is inserted into shroud cavity 107, and barrel 122 is inserted into plug cavity 159. The plug 150 and shroud are positioned relative to one another such that retention element 180 (in this case, a retention ball biased by retention bias mechanism 181) is compressed by shroud guide surfaces 112.

From barrel 122, locking elements 131 selectively radially extend beyond or retract into locking element carrier 130 depending on whether the electronic barrel lock is in an assembly state, unlocked state, or locked state, respectfully. Locking elements 131 (in this case locking balls), are biased in an assembly, unlocked, or locked position by locking element driver 1005. The position of locking element driver 1005 is controlled by locking element actuator 1003 and biasing members 1006 and 1007, From the assembly state shown in FIG. 10, a force may be applied toward distal end 152 of plug 150, causing retention element 180 to move past distal shroud retention surface 109. At that time retention element 180 may be urged radially outward by retention bias mechanism 181, and a greater portion of barrel 122 is disposed within plug cavity 159. Further application of a force causes further movement of barrel 122 into plug cavity 159. As barrel 122 is inserted into plug cavity 159, locking element actuator 1003 (in this case one or more shape memory alloy (SMA) wires, such as one or more nickel-titanium SMA wires FLEXINOL®)) urges locking element driver 1005 towards the distal end 160 of plug cavity 159. When a distal end of barrel 122 is proximate distal end 160, the locking element driver 1005 is positioned such that locking elements 131 are driven at least partially through locking element carrier 130 and into engagement with locking element receiver 161 and locking surface 162, at which time the security device 1000 is in the locked state.

To unlock the security device, an electronic key may be brought into contact with or in proximity to electronic key interface 1001. Once lock control circuitry 1009 verifies the key, it may cause an electrical current to be applied to the SMA wire(s) of locking element actuator 1003. Application of the electrical current causes the SMA wire(s) of locking element actuator 1003 to change phase (e.g., from a martensite phase to an austenite phase). The phase change causes the SMA wires of locking element actuator 1003 to apply a force axially towards head 104. This causes locking element driver 1005 to be retracted such that locking elements 131 can move radially inward through locking element carrier 130 and disengage from locking element receiver 161. At that point, barrel 122 may be retracted within plug cavity 159.

Figure 11:
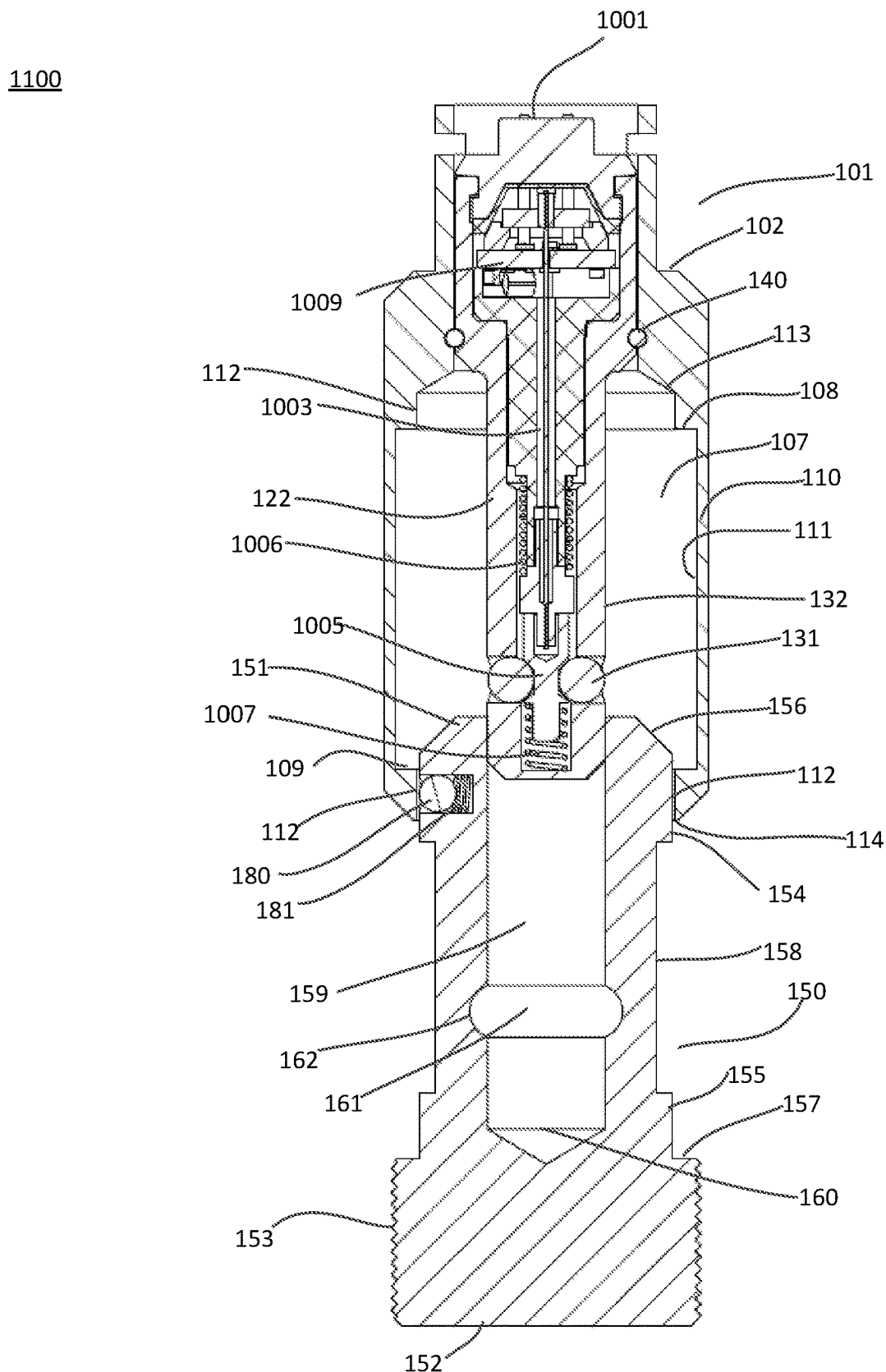
FIG. 11 is a cross sectional view of another example of a security device including a retained shroud, lock, and plug in an assembly state, consistent with the present disclosure.

FIG. 11 depicts another example of a security device consistent with the present disclosure in an assembly. Security device 1100 is the same as security device 1000, except that the electronic lock shown therein is coupled to shroud 101 via a coupling device (e.g., a snap ring) 140. Otherwise, security device 1100 is identical to security device 1000, and may be transitioned from an assembly state to an unlocked state and between the unlocked state and a locked state as described above.

For the sake of example and ease of understanding, the present disclosure has focused on embodiments in which a security device includes shroud and lock that are retained to a plug via one or more retention elements 180, 609. While such retention elements are useful they are not required, and the security devices described herein may be configured in another manner.

Figure 12A:
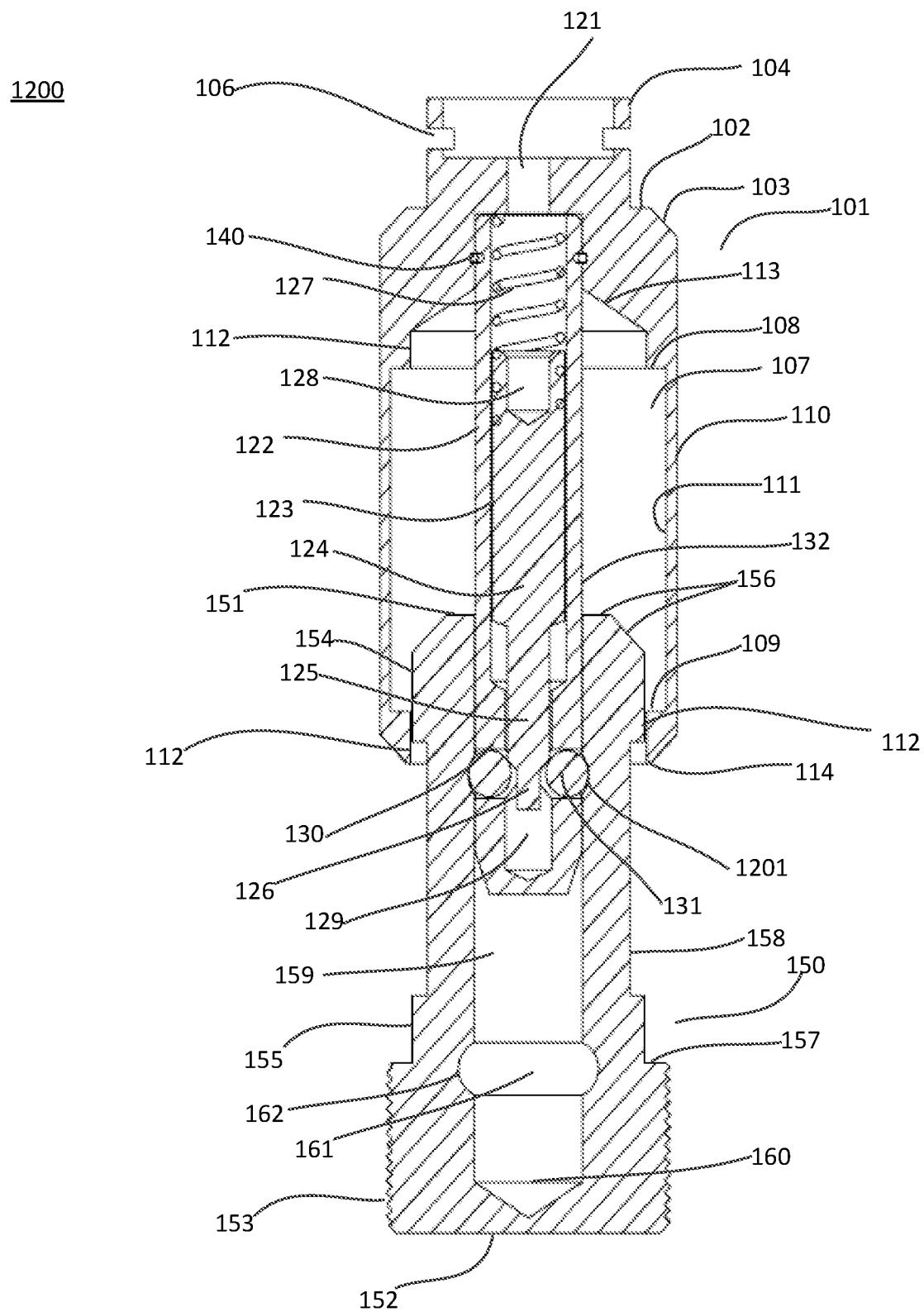
FIG. 12A is a cross sectional view of another example of a security device consistent with the present disclosure, and which includes features for maintaining components of the device in a pre-load state.

FIG. 12A depicts another example of a security device 1200 consistent with the present disclosure, wherein the device includes features for maintaining components thereof in a pre-load state (hereinafter, one or more "pre-load features"). As used herein, the term "pre-load state" refers to a state in which the position of a plug, shroud, and lock are relatively loosely maintained, e.g., with the lock/shroud positioned closer to an open end of the plug cavity than would be the case in the unlocked state. Put differently, the pre-load" position may be understood as a position between the assembly state and unlocked state.

As shown in FIG. 12A, security device 1200 includes many of the elements of shroud 101, lock 120, and plug 150. As the nature and function of such elements are the same as described above regarding other embodiments, they are not reiterated. Security device 1200 differs from the previously described security devices in that it does not include a retention element 180 or 609. Rather, security device 1200 includes a plug 150 that includes a plug cavity 159 with a pre-load feature 1201.

Like the embodiment of FIGS. 6A-6C, pre-load feature 1201 eliminates the need for proximal and distal retention surfaces 108, 109, as described in connection with other embodiments, though for illustration such surfaces are shown in FIG. 12A. Moreover, security device 1200 differs from security device 600 in that it utilizes a locking element actuator 123 that includes a distal portion 126 with a diameter D1, a medial portion 125 with a diameter D2, and a proximal portion 124 with a diameter D3 (whereas locking element actuator 123 in security device 600 included four regions with four different diameters).

Figure 12B:
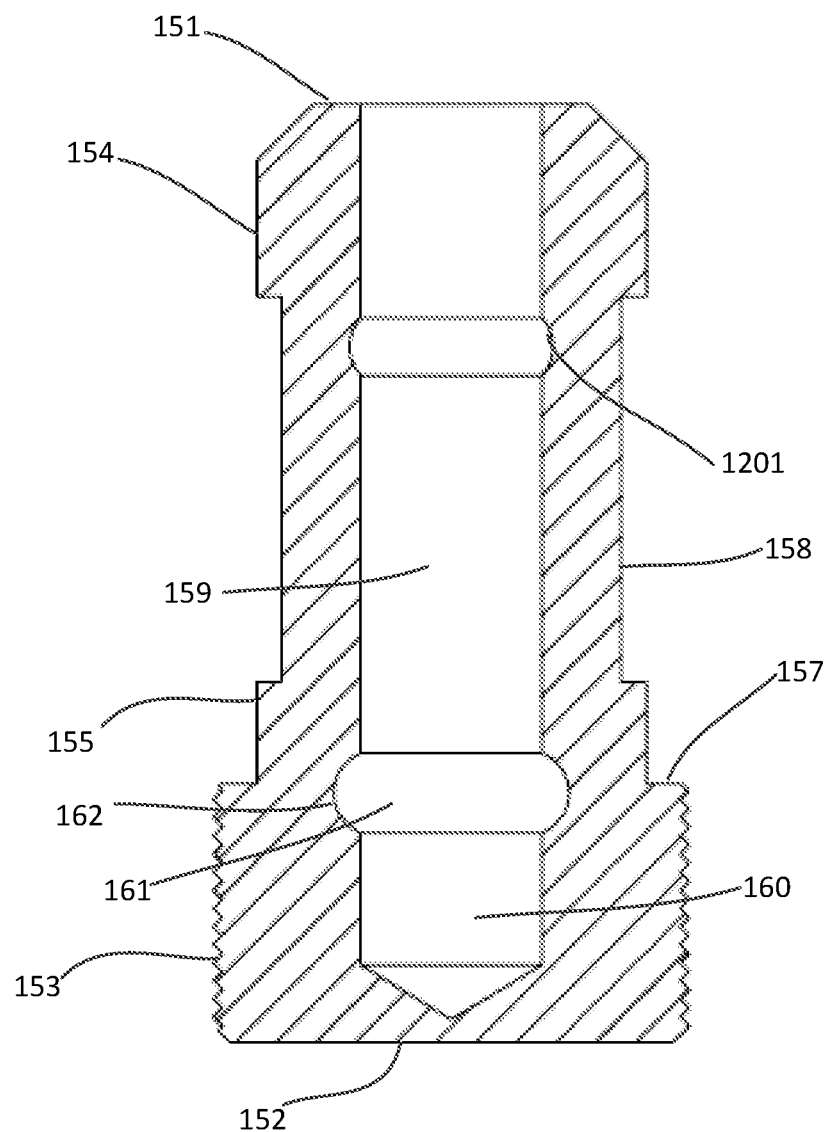
FIG. 12B is a cross sectional view of a plug used in FIG. 12A, including features for maintaining a security device in a pre-load state.

More specifically and as best shown in FIG. 12B, pre-load feature 1201 is in the form of an annular groove that is located within plug cavity 159 at a point that is more proximate to plug proximal end 151 than locking element receiver 161. Of course, pre-load feature 1201 is not limited to an annular groove, and may be configured in any suitable manner that allows security device 1200 to be maintained in a pre-load state. In instances where pre-load feature 1201 is an annular groove, the depth of pre-load feature (e.g., a radius thereof) may be less than a depth (radius) of locking element receiver 161 or, more specifically, locking surface 162.

When security device 1200 is in the pre-load state shown in FIG. 12A, barrel 122 is positioned within plug cavity 159 such that locking elements 131 are confined within locking element carrier 130 by the proximal portion of the plug cavity 159. When locking elements 131 are located proximate the pre-load feature 1201, the bias mechanism 127 (e.g., a spring) urges the locking element actuator distally toward distal end 160 of plug cavity 159. This causes a distal surface (not labeled) of medial portion 125 of locking element actuator 123 to bear against locking elements 131 and force locking elements 131 partially through locking element carrier 130 and into engagement with pre-load feature 1201. At this point, lock 120 may be removed from plug cavity 159 by applying an axial force towards head 104 (i.e., by pulling lock 120 and shroud 101 toward head 104). For example, application of such a force can overcome the force applied by bias mechanism 127 (e.g., a spring) towards distal end 152, which causes locking element actuator 123 to retract and allows locking elements 131 to disengage pre-load feature 1201 and move radially inward.

Security device 1200 may be advanced from the pre-load state of FIG. 12A to a locked state by the application of a force along an axis extending through the barrel 122, shroud cavity 107, and plug cavity 159. Application of such force causes the barrel 122 and locking element actuator 123 to move further toward distal end 152 of plug 150. As locking element actuator 123 moves distally, the distal surface of medial portion bears against locking elements 131 with sufficient force to disengage locking elements 131 from pre-load feature 1201 and move into locking element carrier 130. The lock 120 may then be further advanced distally within plug cavity 159 until locking elements 131 are proximate locking element received 161. At that point the locking elements 131 may move radially outward to engage locking surface 162, in the same manner as described above in connection with other embodiments. Security device 1200 may be returned to the pre-load state in the same manner as previously described above regarding transitioning other embodiments from a locked state to an assembly state.

Figure 13:
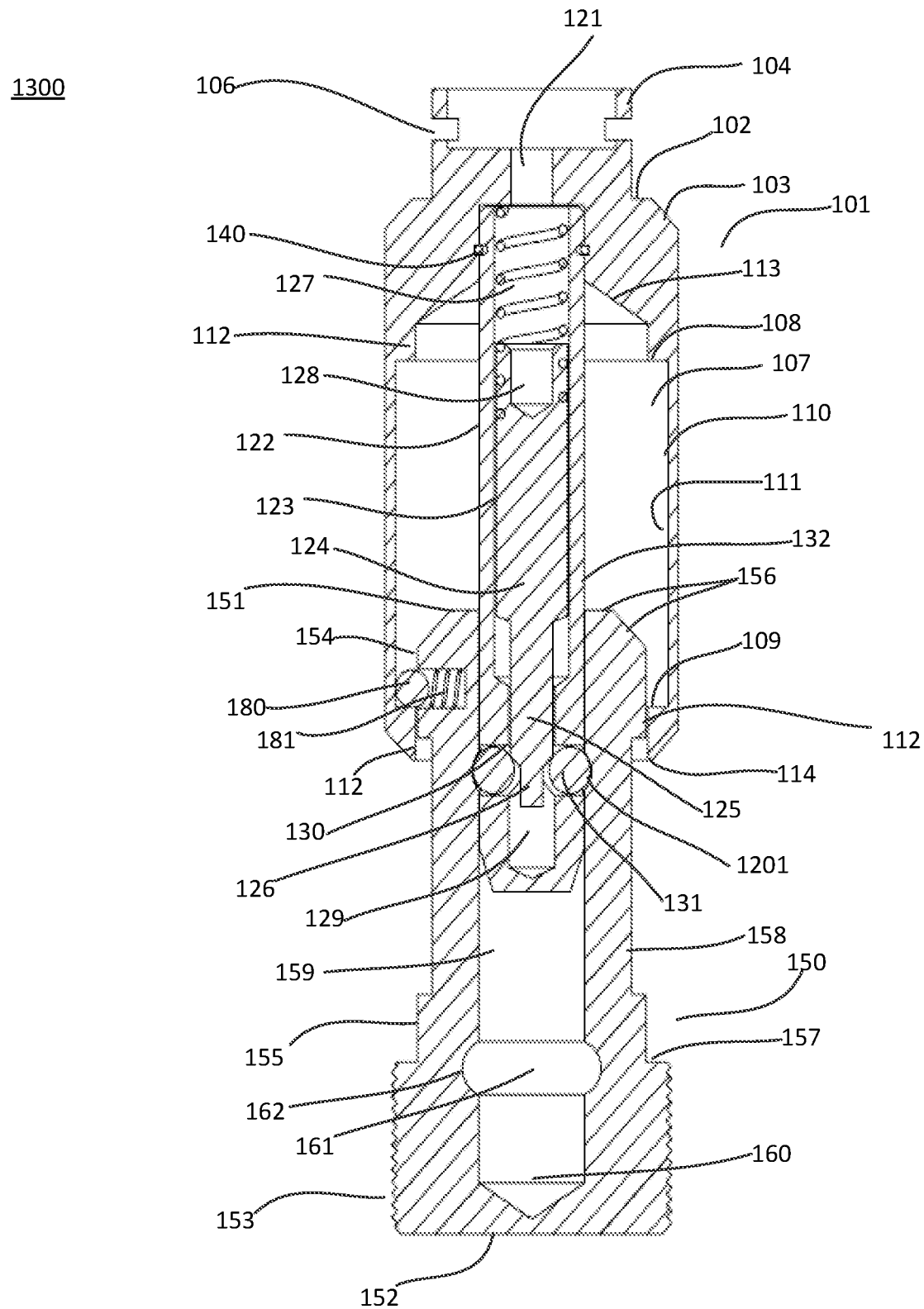
FIG. 13 is a cross sectional view of another example of a security device, including a retention mechanism and features for maintaining components of the device in a pre-load state.

It should be understood that the pre-load features described herein need not be used independently of the retention features described herein, and vice versa. Indeed, the pre-load features described herein can be used instead of or in combination with the retention features described herein, and vice versa. As one illustration of that concept reference is made to FIG. 13, which is a cross section of another example of a security device consistent with the present disclosure. As shown, security device 1300 includes a retention element 180 and retention bias mechanism 181 and a pre-load feature 1201. The nature and function of such elements is same as previously described in connection with other embodiments, except that pre-load feature 1201 in FIG. 13 is used in conjunction with retention element 180 (and vice versa), as opposed to the two features being used independently of one another.

Various embodiments of security devices are described above, and include a lock that is integral with or coupled to a shroud in some manner. For example and as described above, the security devices described herein may include a lock that is coupled to a shroud via a snap ring, captivation between elements of the lock and the shroud, or the like. While such embodiments are useful, it should be understood that the locks described herein need not be coupled to the shroud. For example, in embodiments the shroud's described herein may have a shroud cavity that extends through the cap thereof, so as to terminate in a proximal open end. In such embodiments the locks described herein may be configured such that they are receivable in the shroud cavity, e.g., by insertion into the proximal open end of the shroud cavity. When the security device is in the locked state, the lock may be retained within the shroud cavity by the interaction of the above described locking elements and locking element receivers/locking surfaces. In the unlocked state, the lock may be removed from the shroud cavity by withdrawing it from the proximal open end.

It should also be understood that when the locks described herein are coupled the shroud (e.g., via a snap ring, captivation, or the like) or are receivable within the shroud, the lock itself may rotate about an axis existing through the lock and along the plug cavity when the security device is in a locked state. As may be appreciated, this can hinder or thwart certain types of attacks on the security device. For example if the lock is subject to a drilling attack, rotation of the drill (or a bit thereof) may cause the lock to spin, hindering or even preventing the attack from successfully drilling out the lock.

Another aspect of the present disclosure relates to security device kits that include components which can be assembled into a security device consistent with the present disclosure. In embodiments the security device kit includes a shroud, a lock, and a plug consistent with the present disclosure, but it should be understood that the kits could include one or a subset of such components, which may be assembled from components of other kits to form a security device consistent with the present disclosure. Put in other terms, the kits described herein may include, one, more than one, or all of the components of a security device consistent with the present disclosure. In embodiments the kits described herein include a shroud and a lock consistent with the present disclosure, optionally in combination with a plug consistent with the present disclosure. In other embodiments the kit includes shroud and plug consistent with the present disclosure, wherein the shroud and lock are configured to be compatible with (i.e., to receive) appropriate portions of a separately provided lock, such as a barrel lock. And in still further embodiments, the kits include a shroud, lock, and plug consistent with the present disclosure. As the components of such kits are configured in the same manner as the components of the security devices described herein, the nature and function of those components is not described again in the interest of brevity. One example of a kit consistent with the present disclosure is a kit that includes the components of FIG. 1G, wherein the illustrated lock is provided separate from or integral with/coupled to the illustrated shroud.

EXAMPLES

Example 1

According to this example there is provided a security device, including: a shroud including at least one shroud sidewall having an inward facing surface and an outward facing surface; a lock including a barrel, wherein the lock is integral with or coupled to the shroud and a shroud cavity is defined between an outward facing surface of the barrel and the inward facing surface of the at least one shroud sidewall; and a plug including a proximal end, a distal end, and at least one plug sidewall receivable within the shroud cavity, the at least one plug sidewall including at least one inward facing surface defining a plug cavity that is configured to receive the barrel of the lock therein; wherein: the security device is movable between a locked and unlocked state; in the locked and unlocked states, the proximal end of the plug is disposed within the shroud cavity, a distal end of the barrel is disposed within the plug cavity, and the shroud is rotatable about the plug.

Example 2

This example includes any or all of the elements of example 1, wherein the security device further includes at least one retention element configured to retain at least a portion of the plug within the shroud cavity when the security device is in the unlocked state.

Example 3

This example includes any or all of the elements of example 2 wherein: the lock further includes a lock shaft within the barrel, a locking element actuator within the lock shaft, and at least one locking element that is movable between a locked and unlocked state via the locking element actuator; the plug cavity further includes a locking element receiver that is configured to receive the at least one locking element; in the locked state, the locking element actuator is located toward a distal end of the lock shaft and urges the at least one locking element into engagement with the locking element receiver; and in the unlocked state, the locking element actuator is located toward a proximal end of the lock shaft and the at least one locking element is disengaged from the locking element receiver.

Example 4

This example includes any or all of the elements of example 2, wherein the at least one retention element includes a retention ball, a retention pin, a retention surface, or one or more combinations thereof.

Example 5

This example includes any or all of the elements of example 4, wherein the at least one retention element includes a retention ball, a retention pin, or a combination thereof.

Example 6

This example includes any or all of the elements of example 5, wherein: the at least one plug sidewall further includes an outer surface and at least one retention housing; and the at least one retention element is at least partially disposed within the at least one retention housing and between the inward facing surface of the shroud and at least one surface of the retention housing.

Example 7

This example includes any or all of the elements of example 6, further including a retention bias mechanism that is configured to bias the at least one retention element against the inward facing surface of the shroud.

Example 8

This example includes any or all of the elements of example 7, wherein the retention bias mechanism includes a spring.

Example 9

This example includes any or all of the elements of example 7, wherein: the at least one shroud sidewall includes proximal and distal retention surfaces that each extend inwardly towards the barrel of the lock; and in the unlocked state, the at least one retention element abuts the distal retention surface, so as to prevent removal of the proximal end of the plug from the shroud cavity; and in the locked state, the at least one retention element is disposed proximate to the proximal retention surface.

Example 10

This example includes any or all of the elements of example 4, wherein: the at least one retention element includes a retention surface, the retention surface including at least a portion of the inward facing surface of the at least one shroud sidewall; the plug further includes proximal and distal interference surfaces; in the unlocked state, the at least one retention surface abuts the proximal interference surface, so as to inhibit removal of the proximal end of the plug from the shroud cavity; and in the locked state, the at least one retention surface is disposed proximate to the distal interference surface.

Example 11

This example includes any or all of the elements of example 4, wherein: the at least one retention element includes a plug retention surface within the plug cavity; the lock further includes a lock shaft within the barrel, a locking element actuator within the lock shaft, and at least one locking element that is movable between a locked and unlocked state via the locking element actuator; and in the unlocked state, the plug retention surface interferes with the at least one locking element, so as to inhibit removal of the proximal end of the plug from the shroud cavity.

Example 12

This example includes any or all of the elements of example 11, wherein: the plug further includes a locking element receiver; and in the locked state, the locking element actuator is located toward a distal end of the lock shaft and the at least one locking element is engaged within the locking element receiver; and in the unlocked state, the locking element actuator is located toward a proximal end of the lock shaft and the at least one locking element is disengaged from the locking element receiver.

Example 13

This example includes any or all of the elements of example 2, wherein: the at least one plug sidewall further includes an outer surface; at least a portion of the outer surface of the at least one plug sidewall includes at least one gripping surface; when the security device is in the locked state, all or substantially all of the at least one gripping surface is disposed within the shroud cavity such that all or substantially all of the at least one gripping surface is covered by the at least one shroud sidewall; and when the security device is in the unlocked state, all or substantially all of the at least one gripping surface is disposed outside the shroud cavity, such that all or substantially all of the at least one gripping surface is exposed.

Example 14

This example includes any or all of the elements of example 13, wherein: the plug further includes threads on a distal portion of the outer surface of the at least one plug sidewall.

Example 15

This example includes any or all of the elements of example 2, wherein the lock is integral with the shroud.

Example 16

This example includes any or all of the elements of example 2, wherein the lock is coupled to the shroud by a snap ring, a threaded connection, or a combination thereof.

Example 17

This example includes any or all of the elements of example 2, wherein: the shroud cavity comprises a proximal opening; the lock is receivable within the shroud by insertion into the proximal opening; in the locked state, the lock is retained within the shroud cavity; and in the unlocked state, the lock is removable from the shroud cavity by withdrawing it from the proximal opening.

Example 18

This example includes any or all of the elements of example 2, wherein: the locking element actuator includes a plunger including a distal portion, a proximal portion, and a medial portion between the proximal and distal portions; the distal portion has a diameter $D1$; the medial portion has a diameter $D2$; the proximal portion has a diameter $D3$; and $D3>D2>D1$.

Example 19

This example includes any or all of the elements of example 18, wherein: the barrel includes at least one opening; in the unlocked state, the at least one locking element abuts the first medial portion of the locking element actuator such that the at least one locking element is disengaged from the locking element receiver, enabling movement of the barrel within the plug cavity and away from the distal end of the plug, but part of the at least one locking element extends through the at least one opening to interfere with the plug retention surface, inhibiting removal of the proximal end of the plug from the shroud cavity; in the locked state, the at least one locking element abuts the second medial portion of the locking element actuator, such that the at least one locking element is received within the locking element receiver.

Example 20

This example includes any or all of the elements of example 12, wherein: the locking element actuator includes a plunger including a distal portion, a proximal portion, a first medial portion between the proximal and distal portions, and a second medial portion between the first medial portion and the proximal portion; the distal portion has a diameter $D1$; the first medial portion has a diameter $D2$; the second medial portion has a diameter $D3$; the proximal portion has a diameter $D4$; and $D4>D3>D2>D1$.

Example 21

This example includes any or all of the elements of example 20, wherein: the barrel includes at least one opening; in the unlocked state, the at least one locking element abuts the first medial portion of the locking element actuator such that the at least one locking element is disengaged from the locking element receiver, enabling movement of the barrel within the plug cavity and away from the distal end of the plug, but part of the at least one locking element extends through the at least one opening to interfere with said plug retention surface, inhibiting removal of the proximal end of the plug from the shroud cavity; in the locked state, the at least one locking element abuts the second medial portion of the locking element actuator, such that the at least one locking element is received within the locking element receiver.

Example 22

According to this example there is provided a security device kit, including: a shroud including at least one shroud sidewall having an inward facing surface and an outward facing surface; a lock including a barrel, wherein the lock is integral with the shroud, coupled to the shroud, or separate from and receivable within the shroud, and a shroud cavity is defined between an outward facing surface of the barrel and the inward facing surface of the at least one shroud sidewall; and a plug including a proximal end, a distal end, and at least one plug sidewall receivable within the shroud cavity, the at least one plug sidewall including at least one inward facing surface defining a plug cavity that is configured to receive the barrel of the lock therein; wherein: the shroud, lock and plug can be assembled together into a security device that is movable between a locked and unlocked state; in the locked and unlocked states, the proximal end of the plug is disposed within the shroud cavity, a distal end of the barrel is disposed within the plug cavity, and the shroud is freely rotatable about the plug.

Example 23

This example includes any or all of the features of example 22, wherein the plug further includes at least one retention element configured to retain at least a portion of the plug within the shroud cavity when the lock, shroud, and plug are assembled into the security device and the security device is in the unlocked state.

Example 24

This example includes any or all of the features of example 23, wherein: the lock further includes a lock shaft within the barrel, a locking element actuator within the lock shaft, and at least one locking element that is movable between a locked and unlocked state via the locking element actuator; the plug cavity further includes a locking element receiver that is configured to receive the at least one locking element; in the locked state, the locking element actuator is located toward a distal end of the lock shaft and urges the at least one locking element into engagement with the locking element receiver; and in the unlocked state, the locking element actuator is located toward a proximal end of the lock shaft and the at least one locking element is disengaged from the locking element receiver.

Example 25

This example includes any or all of the features of example 23, wherein the at least one retention element includes a retention ball, a retention pin, a retention surface, or one or more combinations thereof.

Example 26

This example includes any or all of the features of example 25, wherein the at least one retention element includes a retention ball, a retention pin, or a combination thereof.

Example 27

This example includes any or all of the features of example example 25, wherein: the at least one plug sidewall further includes an outer surface and at least one retention housing; and the at least one retention element is at least partially disposed within the at least one retention housing and between the inward facing surface of the shroud and at least one surface of the retention housing.

Example 28

This example includes any or all of the features of example 26, and further includes a retention bias mechanism that is configured to bias the at least one retention element against the inward facing surface of the shroud.

Example 29

This example includes any or all of the features of example 28, wherein the retention bias mechanism includes a spring.

Example 30

This example includes any or all of the features of example 28, wherein: the at least one shroud sidewall includes proximal and distal retention surfaces that each extend inwardly towards the barrel of the lock; and in the unlocked state, the at least one retention element abuts the distal retention surface, so as to prevent removal of the proximal end of the plug from the shroud cavity; and in the locked state, the at least one retention element is disposed proximate to the proximal retention surface.

Example 31

This example includes any or all of the features of example 25, wherein: the at least one retention element includes a retention surface, the retention surface including at least a portion of the inward facing surface of the at least one shroud sidewall; the plug further includes proximal and distal interference surfaces; in the unlocked state, the at least one retention surface abuts the proximal interference surface, so as to inhibit removal of the proximal end of the plug from the shroud cavity; and in the locked state, the at least one retention element is disposed proximate to the distal retention surface.

Example 32

This example includes any or all of the features of example 25, wherein: the at least one retention element includes a plug retention surface within the plug cavity; the lock further includes a lock shaft within the barrel, a locking element actuator within the lock shaft, and at least one locking element that is movable between a locked and unlocked state via the locking element actuator; and in the unlocked state, the plug retention surface interferes with the at least one locking element, so as to inhibit removal of the proximal end of the plug from the shroud cavity.

Example 33

This example includes any or all of the features of example 32, wherein: the lock shaft further includes a locking element receiver; and in the locked state, the locking element actuator is located toward a distal end of the lock shaft and the at least one locking element is engaged within the locking element receiver; and in the unlocked state, the locking element actuator is located toward a proximal end of the lock shaft and the at least one locking element is disengaged from the locking element receiver.

Example 34

This example includes any or all of the features of example 23, wherein: the at least one plug sidewall further includes an outer surface; at least a portion of the outer surface of the at least one plug sidewall includes at least one gripping surface; when the security device is in the locked state, all or substantially all of the at least one gripping surface is disposed within the shroud cavity such that all or substantially all of the at least one gripping surface is covered by the at least one shroud sidewall; and when the security device is in the unlocked state, all or substantially all of the at least one gripping surface is disposed outside the shroud cavity, such that all or substantially all of the at least one gripping surface is exposed.

Example 35

This example includes any or all of the features of example 34, wherein: the plug further includes threads on a distal portion of the outer surface of the at least one plug sidewall.

Example 36

This example includes any or all of the features of example 35, wherein the lock is integral with the shroud.

Example 37

This example includes any or all of the features of example 23, wherein the lock is coupled to the shroud by a snap ring, a threaded connection, or a combination thereof.

Example 38

This example includes any or all of the features of example 23, wherein: the shroud cavity includes a proximal opening; the lock is receivable within the shroud by insertion into the proximal opening; in the locked state, the lock is retained within the shroud cavity; and in the unlocked state, the lock is removable from the shroud cavity by withdrawing it from the proximal opening.

Example 39

This example includes any or all of the features of example 24, wherein: the locking element actuator includes a plunger including a distal portion, a proximal portion, and a medial portion between the proximal and distal portions; the distal portion has a diameter D1; the medial portion has a diameter D2; the proximal portion has a diameter D3; and D3>D2>D1.

Example 40

This example includes any or all of the features of example 39, wherein: the barrel includes at least one opening; in the unlocked state, the at least one locking element abuts the distal portion of the locking element actuator such that the at least one locking element is disengaged from the locking element receiver, enabling movement of the barrel within the plug cavity and away from the distal end of the plug; and in the locked state, the at least one locking element abuts the medial portion of the locking element actuator, such that the at least one locking element is disposed partially through the opening of the barrel and is received within the locking element receiver.

Example 41

This example includes any or all of the features of example 33, wherein: the locking element actuator includes a plunger including a distal portion, a proximal portion, a first medial portion between the proximal and distal portions, and a second medial portion between the first medial portion and the proximal portion; the distal portion has a diameter D1; the first medial portion has a diameter D2; the second medial portion has a diameter D3; the proximal portion has a diameter D4; and D4>D3>D2>D1.

Example 42

This example includes any or all of the features of example 41, wherein: the barrel includes at least one opening; in the unlocked state, the at least one locking element abuts the first medial portion of the locking element actuator such that the at least one locking element is disengaged from the locking element receiver, enabling movement of the barrel within the plug cavity and away from the distal end of the plug, but part of the at least one locking element extends through the at least one opening to interfere with the plug retention surface, inhibiting removal of the proximal end of the plug from the shroud cavity; in the locked state, the at least one locking element abuts the second medial portion of the locking element actuator, such that the at least one locking element is received within the locking element receiver.

As will be appreciated from the foregoing, the security devices and kits of the present disclosure offer an integrated design that is relatively easy to manufacture and use, and which can be quickly installed without the need for on-site assembly or a key. For example, the security devices described herein may be installed by a technician by quickly screwing the threads of the retained plug into corresponding threads in a pipe or conduit. Once the plug is screwed into the pipe or conduit, the security device may be easily advanced to the locked position without a key by applying a force in the direction of the plug, causing the retained shroud to slide down over gripping surfaces on the plug, as previously described. Thus, apart from the use of a conventional tools such as a wrench (which may not even be required), the security devices may be installed quickly and conveniently, and without the risk of lost parts and/or keys.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A security device, comprising:
 a shroud comprising at least one shroud sidewall having an inward facing surface and an outward facing surface;
 a lock comprising a barrel, wherein the lock is integral with, coupled to, or receivable within the shroud, and a shroud cavity is defined between an outward facing surface of the barrel and the inward facing surface of the at least one shroud sidewall; and a plug comprising a proximal end, a distal end, and at least one plug sidewall receivable within the shroud cavity, the at least one plug sidewall comprising at least one inward facing surface defining a plug cavity that is configured to receive the barrel of said lock therein;

wherein:
the security device is movable between a locked and unlocked state;
in the locked and unlocked states, the proximal end of the plug is disposed within the shroud cavity, a distal end of the barrel is disposed within the plug cavity, and the shroud is freely rotatable about said plug;
wherein the security device further comprises at least one retention element configured to retain at least a portion of the plug within the shroud cavity when the security device is in the unlocked state.

2. The security device of claim 1, wherein:
the lock further comprises a lock shaft within the barrel, a locking element actuator within the lock shaft, and at least one locking element that is movable between a locked and unlocked state via the locking element actuator;
the plug cavity further comprises a locking element receiver that is configured to receive the at least one locking element;
in the locked state, the locking element actuator is located toward a distal end of said lock shaft and urges said at least one locking element into engagement with the locking element receiver; and
in the unlocked state, the locking element actuator is located toward a proximal end of said lock shaft and said at least one locking element is disengaged from the locking element receiver.

3. The security device of claim 1, wherein said at least one retention element comprises a retention ball, a retention pin, a retention surface, or one or more combinations thereof.

4. The security device of claim 3, wherein said at least one retention element comprises a retention ball, a retention pin, or a combination thereof.

5. The security device of claim 4, wherein:
said at least one plug sidewall further comprises an outer surface and at least one retention housing; and
said at least one retention element is at least partially disposed within said at least one retention housing and between the inward facing surface of the shroud and at least one surface of the retention housing.

6. The security device of claim 5, further comprising a retention bias mechanism that is configured to bias the at least one retention element against the inward facing surface of the shroud.

7. The security device of claim 6, wherein the retention bias mechanism comprises a spring.

8. The security device of claim 6, wherein:
said at least one shroud sidewall comprises proximal and distal retention surfaces that each extend inwardly towards said barrel of said lock; and
in said unlocked state, the at least one retention element abuts said distal retention surface, so as to prevent removal of said proximal end of said plug from said shroud cavity; and
in said locked state, the at least one retention element is disposed proximate to the proximal retention surface.

9. The security device of claim 3, wherein:
the at least one retention element comprises a retention surface, the retention surface comprising at least a portion of the inward facing surface of the at least one shroud sidewall;
the plug further comprises proximal and distal interference surfaces;
in said unlocked state, the at least one retention surface abuts said proximal interference surface, so as to inhibit removal of said proximal end of said plug from said shroud cavity; and
in said locked state, the at least one retention surface is disposed proximate to the distal interference surface.

10. The security device of claim 3, wherein:
the at least one retention element comprises a plug retention surface within the plug cavity;
the lock further comprises a lock shaft within the barrel, a locking element actuator within the lock shaft, and at least one locking element that is movable between a locked and unlocked state via the locking element actuator; and
in the unlocked state, the plug retention surface interferes with the at least one locking element, so as to inhibit removal of said proximal end of said plug from said shroud cavity.

11. The security device of claim 10, wherein:
the plug further comprises a locking element receiver; and
in the locked state, the locking element actuator is located toward a distal end of said lock shaft and said at least one locking element is engaged within the locking element receiver; and
in the unlocked state, the locking element actuator is located toward a proximal end of said lock shaft and said at least one locking element is disengaged from the locking element receiver.

12. The security device of claim 1, wherein:
the at least one plug sidewall further comprises an outer surface;
at least a portion of the outer surface of the at least one plug sidewall comprises at least one gripping surface;
when the security device is in the locked state, all or substantially all of the at least one gripping surface is disposed within the shroud cavity such that all or substantially all of the at least one gripping surface is covered by the at least one shroud sidewall; and
when the security device is in the unlocked state, all or substantially all of the at least one gripping surface is disposed outside the shroud cavity, such that all or substantially all of the at least one gripping surface is exposed.

13. The security device of claim 1, wherein the lock is integral with the shroud.

14. The security device of claim 1, wherein the lock is coupled to the shroud by a snap ring, a threaded connection, or a combination thereof.

15. The security device of claim 1, wherein:
the shroud cavity comprises a proximal opening;
the lock is receivable within the shroud by insertion into the proximal opening;
in the locked state, the lock is retained within the shroud cavity; and
in the unlocked state, the lock is removable from the shroud cavity by withdrawing it from the proximal opening.

16. The security device of claim 2, wherein:

the locking element actuator comprises a plunger comprising a distal portion, a proximal portion, and a medial portion between the proximal and distal portions;

the distal portion has a diameter D1;

the medial portion has a diameter D2;

the proximal portion has a diameter D3; and

D3>D2>D1.

17. The security device of claim 16, wherein:

the barrel comprises at least one opening;

in the unlocked state, the at least one locking element abuts the distal portion of the locking element actuator such that the at least one locking element is disengaged from the locking element receiver, enabling movement of the barrel within the plug cavity and away from the distal end of the plug; and in the locked state, the at least one locking element abuts the medial portion of the locking element actuator, such that the at least one locking element is disposed partially through the opening of the barrel and is received within the locking element receiver.

18. The security device of claim 11, wherein:

the locking element actuator comprises a plunger comprising a distal portion, a proximal portion, a first medial portion between the proximal and distal portions, and a second medial portion between the first medial portion and the proximal portion;

the distal portion has a diameter D1;

the first medial portion has a diameter D2;

the second medial portion has a diameter D3;

the proximal portion has a diameter D4; and

D4>D3>D2>D1.

19. The security device of claim 18, wherein:

the barrel comprises at least one opening;

in the unlocked state, the at least one locking element abuts the first medial portion of the locking element actuator such that the at least one locking element is disengaged from the locking element receiver, enabling movement of the barrel within the plug cavity and away from the distal end of the plug, but part of the at least one locking element extends through the at least one opening to interfere with said plug retention surface, inhibiting removal of the proximal end of the plug from the shroud cavity;

in the locked state, the at least one locking element abuts the second medial portion of the locking element actuator, such that the at least one locking element is received within the locking element receiver.

* * * * *